United States Patent [19]

Ochiai et al.

[11] Patent Number: 5,796,611
[45] Date of Patent: Aug. 18, 1998

[54] WEATHER FORECAST APPARATUS AND METHOD BASED ON RECOGNITION OF ECHO PATTERNS OF RADAR IMAGES

[75] Inventors: Keihiro Ochiai, Yokohama; Hideto Suzuki, Yokosuka; Noboru Sonehara, Zushi, all of Japan

[73] Assignee: Nippon Telegraph and Telephone Corporation, Tokyo, Japan

[21] Appl. No.: 538,723

[22] Filed: Oct. 3, 1995

[30] Foreign Application Priority Data

Oct. 4, 1994 [JP] Japan ................................ 6-239791
May 1, 1995 [JP] Japan ................................ 7-107334
May 1, 1995 [JP] Japan ................................ 7-107335

[51] Int. Cl.$^6$ .......................... G06F 17/10; G01S 13/95; G01W 01/10
[52] U.S. Cl. .................... 364/420; 73/170.16; 340/601; 395/1; 395/10; 395/20; 395/21; 395/23; 395/50
[58] Field of Search ............... 73/170.16; 340/601; 364/420; 342/26; 395/1, 10, 20, 21, 23, 50

[56] References Cited

U.S. PATENT DOCUMENTS

| | | | |
|---|---|---|---|
| 5,175,796 | 12/1992 | Refregier et al. | 395/11 |
| 5,406,481 | 4/1995 | Shinozawa et al. | 364/420 |
| 5,515,477 | 5/1996 | Sutherland | 395/27 |
| 5,528,224 | 6/1996 | Wang | 340/583 |
| 5,673,366 | 9/1997 | Maynard et al. | 395/20 |

OTHER PUBLICATIONS

R.M. Haralick et al., "Textural Features for Image Classification", IEEE Transactions on Systems, Man and Cybernetics, SMC–3(6):610–621 (1973).

Murao et al., "Complex Neural Network System for Forecasting the Amount of Rainfall by using Meteorological Satellite Images", SICE, 107–112 (1993).

Murao et al., "Application of Network System for Forcasting the Amount of Rainfall by Using Meteorological Satellite Images", SICE, 303–309 (1992).

Ueda et al., "Competitive and Selective Learning Method for Vector Quantizer Design—Equidistortion Principle and Its Algorithm", IEICE (D–II) 11:2265–2278 (1994).

R. Haralick, "Statistical and Structural Approaches to Texture", IEEE, 67(5):786–804 (1979).

J. Weszka et al., "A Comparative Study of Texture Measures for Terrain Classification, IEEE Trans. on Sys., Man, and Cyber., SMC–6(4):269–285 (1976).

T. Kohonen, "The Self–Organizing Map", IEEE, 78(9):1464–1480 (1990).

Primary Examiner—Edward R. Cosimano
Attorney, Agent, or Firm—Finnegan, Henderson, Farabow, Garrett & Dunner, L.L.P

[57] ABSTRACT

The present invention provides a weather forecast apparatus and a method for the same, to systematically classify a measured radar image based on results of pattern classification of past radar images so as to use the classified radar image. In the present invention, rapid forecasting is possible by making the FNN model previously learn based on data of each class (and indexes for forecast times) obtained by classification of past weather data for every resembling pattern. In addition, a calculation procedure for improving the classifying ability of patterns can be established by varying the procedure for calculating feature quantities with regard to the radar image by using the learning of the TNN model. Furthermore, systematic classification of a pre-learned image can be realized by performing self organization with regard to compound feature quantities extracted from a radar image in the PNN model, a typical example of which is a competitive learning model.

12 Claims, 14 Drawing Sheets

• :INPUT VECTOR
× :REFERENCE VECTOR

WEATHER FORECAST APPARATUS AND METHOD BASED ON RECOGNITION OF ECHO PATTERNS OF RADAR IMAGES

BACKGROUND OF THE INVENTION

1. Field of the Invention

The present invention relates to a weather forecast apparatus and to a method for efficiently forecasting the amount of rainfall, snowfall, and the like, using pattern-recognition and the learning of weather radar images by using a neural network model and by systematically classifying the radar images.

2. Description of the Related Art

First of all, an example of the (artificial) neural network model (referred to as the "NN model", hereinafter) to which the present invention can be applied, will be disclosed. The NN model transforms input feature quantities so as to output them as output feature quantities. Here, a hierarchical NN model will be shown as a typical example of the NN model; however, it should be noted that another type NN model such as a cyclic-type having recursive combination can also be used.

The hierarchical NN model is a layered model having an input layer, plural hidden layers, and an output layer. Each layer has units (neurons), weights, and a bias. In FIG. 15, circles represent the units, and smaller circles accompanying the units represent weights (synapses) which are connections to the units immediately in front of the unit. Furthermore, each square indicates a mechanism for adding a bias to the unit.

The function of each unit is to receive a value of "the summation of products which are obtained by multiplying output $O_{p,i}$ of the pth middle layer (i=1, 2, ..., L; L is the number of units belonging to the former layer) with ith weight $W_{j,i}$ belonging to the jth unit in the p+1th layer (i is the number of the weight and corresponds to the unit number in the former layer) and additional bias $w_j$" as an input value and outputs value $y(=o_{p+1,j})$ which is obtained by operating a non-linear transformation $f(\cdot)$ with respect to the input value, and transmits this output value to the next layer. This function is represented by Equation (1), where the input-output transformation function for the units of the input layer is linear, and as the non-linear transformation function $f(\cdot)$ for the units of the other layers, a Sigmoid function is adopted (see Equation (2)). Note that other input-output transformation functions may be used in accordance with the NN model to be used.

$$o_{p+1,j} = f(net_{p,j}) \tag{1}$$

$$= \frac{1}{1 - \exp\left(-\sum_{i=1}^{L} W_{j,i} o_{p,i} + w_j\right)}$$

$$net_{p,j} = \sum_i (W_{j,i} o_{p,i} + w_j)$$

$$y = f(x)$$

$$= 1/\{1 - \exp(-\Sigma w_i x_i + b_i)\} \tag{2}$$

In the above, $\Sigma$ means the summation at i=1 to L.

In a conventional weather forecast apparatus, a method has been proposed in which the movement of clouds ("clouds" indicate a rainfall or snowfall region hereinbelow, and thus "the movement of clouds" indicates weather dynamics) is learned by providing a measured radar image for the NN model, and a future radar image is forecast by using the NN model after learning. For example, in the case of U.S. Pat. No. 5,406,481, a measured radar image is provided for the NN model, which has a calculation unit for summing up products, so as to make the model learn the weather dynamics; and rainfall, snowfall, and the like are forecast by using the NN model after learning. Hereinafter, such a NN model for learning and forecasting is referred to as the "FNN model".

However, no means for systematically classifying and utilizing radar images based on past radar images have been proposed. In addition, for a real-time forecast, the amount of calculations needed for the learning of the FNN model must be much further decreased; however, no means for this necessity has been available.

Next, as a conventional pattern recognition method of images, feature-quantity extraction from an image has been known, and a typical example of it is a texture analysis (Reference 1: Murao, et al., "Kishoo Eisei Gazoo wo Mochiite Koosuiryoo-Suitei wo Okonau Fukugoo-gata Nyuuraru-Nettowaaku-Sisutemu ("Complex Neural Network System for Forecasting the Amount of Rainfall by Using Meteorological Satellite Images")", SICE (Society of Instrument and Control Engineers), Proc. of the 17th Intelligence System Symposium, pp. 107–112, 1993; or R. M. Haralick, "Statistical and Structural Approaches to Texture", Proc. of the IEEE, Vol. 67, No. 5, pp. 786–804, 1979). An example of the calculation procedure for feature quantities used in the texture analysis will be explained below.

For an image in which each pixel has M-gradation, when taking notice of one pixel (x,y), it is called a "target pixel". Then, a pixel which exists in the direction of angle $\theta$ and at a distance of d from the target pixel is specified as an "object pixel". Here, the number $C_{ij}$ of combinations of the pixels satisfying the condition that the notice pixel (x,y) has gray level i and its object pixel has gray level j is counted, and a value obtained by dividing $C_{ij}$ by number $C_{all}$ which indicates the total number of combinations of the pixels existing distance d away from each other is defined as "combination probability density f(i,j) between two pixels". This is represented in equation (3).

$$f(i,j) = C_{ij}/C_{all} \tag{3}$$

Because of $0 \leq i,j < M$, a matrix of M row, M column with each element f(i,j) can be defined as a co-occurrence matrix, as shown below.

$$\begin{pmatrix} f(0,0) & f(0,1) & \cdots & f(0, M-1) \\ \cdot & \cdot & \cdot & \cdot \\ \cdot & \cdot & \cdot & \cdot \\ \cdot & \cdot & \cdot & \cdot \\ f(M-1,0) & f(M-1,1) & \cdots & f(M-1, M-1) \end{pmatrix} \tag{4}$$

According to the co-occurrence matrix, some feature quantities such as energy E, entropy H, correlation C, local homogeneity L, and inertia I, can be calculated, as represented in the following equations.

$$E = \sum_{i=0}^{M-1} \sum_{j=0}^{M-1} \{f(i,j)\}^2 \tag{5}$$

$$H = -\sum_{i=0}^{M-1} \sum_{j=0}^{M-1} f(i,j) \log(f(i,j)) \tag{6}$$

$$C = \frac{\sum_{i=0}^{M-1} \sum_{j=0}^{M-1} (i - v_x)(j - v_y) f(i,j)}{\sigma_x \sigma_y} \tag{7}$$

where

-continued $$v_x = \sum_{i=0}^{M-1} i \sum_{j=0}^{M-1} f(i,j)$$

$$v_y = \sum_{j=0}^{M-1} j \sum_{i=0}^{M-1} f(i,j)$$

$$\sigma_x^2 = \sum_{i=0}^{M-1} (i-v_x)^2 \sum_{j=0}^{M-1} f(i,j)$$

$$\sigma_y^2 = \sum_{j=0}^{M-1} (j-v_y)^2 \sum_{i=0}^{M-1} f(i,j)$$

$$L = \sum_{i=0}^{M-1} \sum_{j=0}^{M-1} \frac{f(i,j)}{1+(i-j)^2} \tag{8}$$

$$I = \sum_{i=0}^{M-1} \sum_{j=0}^{M-1} (i-j)^2 f(i,j) \tag{9}$$

In the conventional method, as shown in the flow chart of FIG. 16, image data are input (see step 251), and the above-mentioned feature quantities are calculated for each image (see step 252). The calculated feature quantities are then compared to each other (see step 253) so as to recognize and classify the pattern of the image, and the recognized result is output (see step 254).

In such a method, the calculation step of extracting the feature quantities from an image is fixed for every kind of image; thus, there is a problem that even if jointly using many kinds of feature quantities for recognizing an image, it is difficult to correctly recognize and classify the image.

In addition, as a method of classifying such feature quantities for the purpose of systematically classifying images, a method of jointing SOM (Self-Organization Map) and LVQ (Learning Vector Quantization) is known (cf. above Reference 1, or Reference 2: Murao, et al., "Kishoo Eisei Gazoo niyoru Koosuiryoo-Suitei eno Nyuuraru-Nettowaaku no Ooyoo ("Application of Network System for Forecasting the Amount of Rainfall by Using Meteorological Satellite Images")", SICE, Proc. of the 18th System Symposium, pp. 303–309, 1992).

However, in this method, only the feature quantities calculated from the co-occurrence matrix are proceeded; other feature quantities as image patterns are not taken into account. Furthermore, in the learning rules known by the classification method according to References 1 or 2, no convergence can be obtained if the distribution of input data is discontinuous, or the distribution has some deviation. Hereinafter, the method of jointing the SOM and the LVQ will be explained in more detail.

As a model, a competitive learning model is used, an example of which is shown in FIG. 17. The competitive learning model is a kind of NN model, a layered network model having one input layer 91 and one output layer 92. In the figure, each unit (neuron) is shown by a circle. Each unit in input layer 91 has a linear input-output function, and an output value of it is propagated to each unit in output layer 92. Each unit in output layer 92 has a reference vector. At the time of learning, with respect to one input vector, one output unit is selected from among all the output units, and by renewing the reference vector of the selected unit, input vectors, that is, as shown in FIG. 18, input data (represented by the marks "●") are quantized (or approximated) by each reference vector (represented by the mark "x") in input space (which has dimensions corresponding to the number of the reference vectors) 93. According to this, the same number of clusters as that of the units in the output layer (that is, the number of the reference vectors) are formed. Each cluster is represented by the reference vector.

These learning rules will be shown below. The input data are represented by x and the reference vectors (N is the number of them) are defined as follows.

$$\{y_j, j=1, \ldots, N\}$$

The next equation defines the quantization error (or quantization distortion) at the approximation of the input data by using the reference vectors.

$$d(x, y_j) = \|x - y_j\|^2 = \sum_{j=1}^{k} (x_i - y_i)^2 \tag{10}$$

In the LVQ method, learning is performed such that the above quantization error is minimized. First, for input data x, reference vector $y_c$ which has a minimum quantization error is chosen, where c is represented as follows.

$$c = \arg \min_j d(x, y_j) \tag{11}$$

Next, only this chosen reference vector is renewed by using the following equation.

$$y_c(t+1) = y_c(t) + \alpha(t)(x - y_c(t)) \tag{12}$$

where t is the repetition number and $\alpha(t)$ is a learning coefficient as follows.

$$\lim_{t \to \infty} \alpha(t) = 0 \tag{13}$$

On the other hand, in the learning rules of the SOM, both the reference vector which has a minimum quantization error with respect to the input data and other reference vector which is in a topological neighborhood relationship with this reference vector are renewed by the following equation.

$$y_c(t+1) = y_c(t) + h_{ci}(x - y_c(t)) \tag{14}$$

where $h_{ci}$ is a coefficient, called a "neighborhood kernel", represented by the following equation (15), such that if $\|y_c - y_i\| \to \infty$, then $h_{ci} \to 0$. By such a kernel, a reference vector which is in the topological neighborhood relationship with the reference vector having a minimum quantization error is chosen.

$$h_{ci} = \alpha(t) \cdot \exp\left(-\frac{\|y_c - y_i\|^2}{2\sigma^2(t)}\right) \tag{15}$$

In the learning of the SOM or the LVQ method, if the distribution of the input data is discontinuous, or the distribution has some deviation, the quantization error (or quantization distortion) at each cluster is increased, whereby there occurs a problem that desired results for the clustering cannot be obtained.

In order to solve such a problem, a selective algorithm has been proposed such that a function of the combination probability density of input data x is defined as $$p(x) = p(x_1, x_2, \ldots, x_k)$$

and expected distortion G is defined as the next equation so as to search for an initial value of the reference vector, which minimizes such distortion (cf. Reference 3: Ueda, et al., "Competitive and Selective Learning Method for Vector Quantizer Design-Equidistortion principle and Its Algorithm-, IEICE(D-II), Vol. J77-D-II, No. 11, pp. 2265–2278, 1994).

$$G = \frac{1}{k} E|d(x, Q(x))| \quad (16)$$

$$= \frac{1}{k} \sum_{i=1}^{N} \int_{S_i} d(x, y_i) p(x) dx$$

$$= \frac{1}{k} \sum_{i=1}^{N} D_i$$

where $E|\cdot|$ means an expected value, $Q(x)$ is a N-level vector quantizer, and $$Q(x) = x_j \text{ if } x \in S_i \ (i=1, 2, \ldots, N)$$

where $S_i$ means an area which is dominated by reference vector $y_j$.

In this selective algorithm, according to the increase of repetition number m, the number $s|m|$ of reference vectors which are to be selected is decreased. After ranking the reference vectors according to their subdistortion $D_i$, the reference vectors with the highest and lowest ranks are alternatively selected. As shown above, the reference vectors which are selected from reference vectors $y_i$ (i=1, . . . , N) is defined as $y_j$ (j=1, . . . , s|m|). This selective algorithm will be explained below.

First Step

For each reference vector $y_j$, subdistortion $D_j|m|$ which is represented by Equation (17) and normalization adaptive degree $g_i$ which is represented by Equation (18) are calculated.

$$D_j|m| = \frac{1}{T} \sum_{x \in S_j} d(x, y) \quad (17)$$

$$g_i = \frac{D_j|m|^r}{\sum_{j=1}^{s|m|} D_j|m|^r} \quad (18)$$

In the above, $S_j$ indicates a dominant area of reference vector $y_j$, as shown in next Equation (19), and $\tau$ (<1.0) is a constant which is not negative.

$$S_j = \left\{ \bigcap_{k, k \neq j} \{x|d(x, y_j) \leq d(x, y_k)\} \right\} \quad (19)$$

Second Step

The following selections ① and ② are performed to determine the number $u_j$ (j=1, . . . , s|m|) of duplicates of the reference vectors.

① For each j, the following formula is calculated.

$$\lfloor g_j s|m| \rfloor$$

where $\lfloor a \rfloor$ means the maximum integer not exceeding a.

② From $g_j[m]$ (j=1, . . . , s|m|), some are selected (the number of $g_j[m]$ to be selected is represented by the following formula) in order of amount.

$$s|m| - \sum_{j=1}^{s|m|} u_j$$

Then, "1" is added to $u_j$ which corresponds to the selected "j".

Third Step

According to number $u_j$ of duplicates of the reference vectors, perturbation shown as $$\delta_{jl}, l=1, \ldots u_j-1$$

which satisfies the following condition $$\|\delta_{jl}\| < \|y_j\|$$

is added to each reference vector so as to generate $u_j-1$ of reference vectors in the neighborhood of reference vector $y_j$.

Hereinafter, the joint rules of the above selective algorithm and the LVQ learning rules (see Equations (10)~(13)) are referred to as "Ueda learning rules".

In the above-explained conventional technique, only feature quantities extracted from the co-occurrence matrix are used as those extracted from images; therefore, there is a problem that the images cannot be classified in accordance with detailed features. For example, when radar weather images are processed, it is necessary to extract a feature as a pattern, such as cirrus clouds, and clouds accompanying a rotating low pressure system, which are seen in typhoons; furthermore, it is also necessary to extract features such as moving directions and speed of clouds. However, conventional techniques cannot extract such features.

Furthermore, in the Ueda learning rules, the method of decreasing the number $s|m|$ of the reference vectors to be selected in each repetition and the method of selecting the reference vectors to be selected are heuristic; thus, in the case that the distribution of each subdistortion has some deviation, it takes a long time for the selection to be completed.

SUMMARY OF THE INVENTION

In consideration of the above problems, it is an object of the present invention to provide an apparatus and a method for weather forecasting, by which it is possible to systematically classify a measured radar image based on results of pattern classification of past radar images, and to use the classified radar image. Other objects of the present invention include shortening the learning time for a radar image, accurately recognizing and classifying a pre-learned image, and forecasting a radar image at any future time using a small amount of calculation.

Therefore, the present invention provides a weather forecast apparatus which provides a weather radar image to an FNN model so that the model learns weather dynamics and forecasts weather by using the FNN model after the learning, comprising: a pattern recognition means, including a PNN model prepared based on classification criteria according to past radar images (that is, a "PNN model" indicates a NN model for pattern classification, and this abbreviated form will be used hereinbelow), for pattern-recognizing a measured radar image by providing the image to the PNN model so as to pattern-classify the radar image; a memory means for storing plural weights for the FNN model, which are determined based on past plural radar images; and a learning means, including the FNN model, for selecting a weight which corresponds to a pattern resembling the pattern of the measured radar image from among those stored in the memory means in accordance with the pattern-recognized result obtained by the pattern recognition means; setting the selected weight as an initial value of the FNN model; and making the FNN model re-learn.

According to the above invention comprising the PNN model based on classification criteria according to past radar images, automatic pattern recognition based on judgment by humans, such as resemblance between the measured radar image and a past radar image, can be realized. Additionally, the initial value of the weight for the FNN model is automatically set in accordance with degree of the resemblance of the radar image pattern; thus, the time required for re-learning can be shortened.

Furthermore, by previously making the FNN model learn by providing the indexes representing plural forecast times, it is possible to forecast a radar image corresponding to any forecast time obtained by any combination of the indexes, with a small amount of calculation.

The present invention also provides a weather forecast method which also performs weather forecasting based on the learning of weather dynamics, the method performing pattern recognition of the radar image by using a TNN model which transforms and outputs feature quantities which were input into the TNN model (that is, a TNN model indicates a NN model for transforming feature quantities, and this abbreviated form will be used hereinbelow), comprising the steps of: calculating and extracting one or more feature quantities from a radar image; providing the feature quantities extracted in the calculating and extracting step for the TNN model as input and teacher data, and learning identical transformation from the feature quantities to the feature quantities; calculating an estimated value based on a criterion for recognition from the output feature quantities which were identically transformed and output from the TNN model; adding perturbation to the output feature quantities; and performing re-learning of the TNN model such that the estimated value is maximized or minimized; and pattern-recognizing a pre-learned image by providing feature quantities calculated and extracted from the pre-learned image for the TNN model after the re-learning.

This method makes it possible to vary the calculation procedure for extracting feature quantities which are used for recognition and classification of images, and to automatically establish a procedure for calculating feature quantities, which are most suitable for the introduced criterion, in the TNN model. As a result, when performing the pattern recognition and classification of a pre-learned image by using the TNN model after the re-learning, recognition accuracy can be improved in comparison with the case of conventional recognizing and classifying method in which only feature quantities extracted from the image are used.

In addition, by adopting a means for adding perturbation for the output value of the TNN model at the re-learning, it is possible to renew the weight by a smaller amount of calculation than in the case of directly adding perturbation to the weight of the NN model.

As an apparatus for implementing this method, the present invention provides a weather forecast apparatus comprising a feature quantity calculating means for calculating and extracting one or more feature quantities from a radar image; a TNN model for transforming and outputting the feature quantities which are input from the feature quantity calculating means; a perturbation generating means for generating an amount of perturbation; a means for calculating an estimated value from the feature quantities output from the TNN model, based on a criterion for recognition; a learning means for providing the feature quantities extracted by the feature quantity calculating means for the TNN model as input and teacher data; and performing identical transformation from the feature quantities to the feature quantities; adding the amount of perturbation to the output feature quantities after the transformation; and performing re-learning of the TNN model such that the estimated value is maximized or minimized; and a recognizing means for pattern-recognizing a pre-learned image according to the estimated value which is obtained when feature quantities calculated and extracted from the pre-learned image are input into the TNN model after the re-learning.

Furthermore, the present invention provides a weather forecast method which also performs weather forecast based on the learning of weather dynamics, the method performing systematic classification of the radar image by using a PNN model which selects reference vectors based on input feature quantities, comprising the steps of: calculating and extracting plural feature quantities from the radar image; providing the feature quantities extracted in the calculating and extracting step for the PNN model, and performing learning of the PNN model by finding a minimum value of an object function such that the quantization error of each reference vector which belongs to each output unit of the PNN model is minimized; and classifying a pre-learned image by providing the feature quantities calculated and extracted from the pre-learned image for the PNN model after the learning.

In this method, by means of providing the object function, for example, in quadratic form, such that the quantization error of each reference vector which belongs to each output unit of the PNN model is minimized, and finding the minimum value of the object function, distortion is monotonically decreased in every repetition time; thus, convergence can be realized by a small number of repetitions. Therefore, it is possible to precisely classify radar images. In addition, if using feature quantities obtained by, for example, a gray level difference method (GLDM) and a gray level run length method (GLRLM) as well as those obtained by the co-occurrence matrix, it becomes possible to recognize a pattern of cirrus clouds or clouds accompanying a rotating low pressure system. Accordingly, detailed classification can be performed.

As an apparatus for implementing this method, the present invention presents a weather forecast apparatus comprising a feature quantity calculating means for calculating and extracting plural feature quantities from a radar image; a PNN model for selecting reference vectors based on the feature quantities which are input from the feature quantity calculating means; a learning means for providing the feature quantities extracted by the calculating and extracting means for the PNN model, and performing learning of the PNN model by finding a minimum value of an object function such that the quantization error of each reference vector which belong to each output unit of the PNN model is minimized; and a classifying means for classifying a class of the image according to the reference vectors which were selected by the PNN model, wherein: systematic classification of a pre-learned image is performed by inputting the feature quantities calculated and extracted from the pre-learned image into the PNN model after the learning.

DESCRIPTION OF THE PREFERRED EMBODIMENTS

Figure 1:
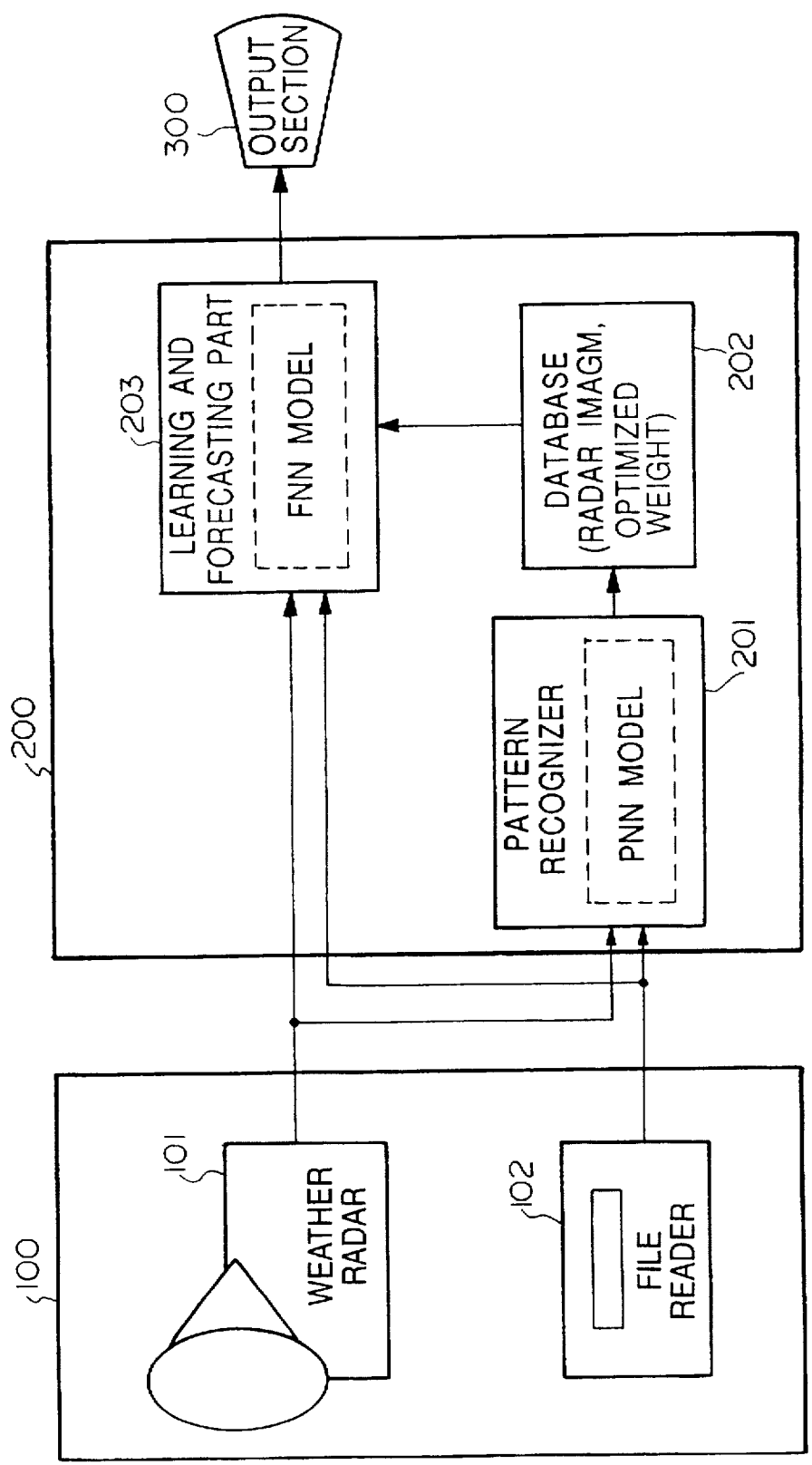
FIG. 1 is a block diagram showing the arrangement of the weather forecast apparatus of the first embodiment according to the present invention.

Hereinafter, embodiments according to the present invention will be explained with reference to the figures.
First Embodiment FIG. 1 is a block diagram showing the arrangement of the weather forecast apparatus of the first embodiment according to the present invention. In the figure, reference numeral 100 indicates an input section, reference numeral 200 indicates a data processor, and reference numeral 300 indicates an output section.

The input section 100 comprises weather radar 101 for measuring a rainfall or snowfall area, and file reader 102 for reading information items required for the learning of the FNN model, the pattern recognition, and the forecast.

The data processor 200 comprises pattern recognizer 201 for recognizing the pattern for the measured radar image; database 202 for systematically classifying and managing the past radar images and optimized weights for the FNN model; and learning and forecasting part 203 for learning the weather dynamics and forecasting a future radar image.

In this weather forecast apparatus, a radar image which was measured by using weather radar 101 in input section 100 is input to be transferred to data processor 200. In addition, data or a coefficient required for the learning is read from file reader 102 to be transferred to pattern recognizer 201 and learning and forecasting part 203.

The pattern recognizer 201 inputs the radar image transferred from input section 100 into the PNN model of its own, and outputs an index for judging which cluster of the database the image belongs to.

In addition, this previously-set PNN model was made to learn with reference to the degree of similarity of radar images with respect to each cluster. Such a degree is determined by humans. The clusters for radar images can be variously determined based on, for example, rain clouds or the shapes of clouds.

The database 202 newly adds the radar image to a cluster which has a resemblance to the pattern with respect to the radar image, according to the judgment of the pattern recognizer. In addition, database 202 transfers the optimized weights and the past radar image which belong to the cluster to the learning and forecasting part 203.

Figure 15:
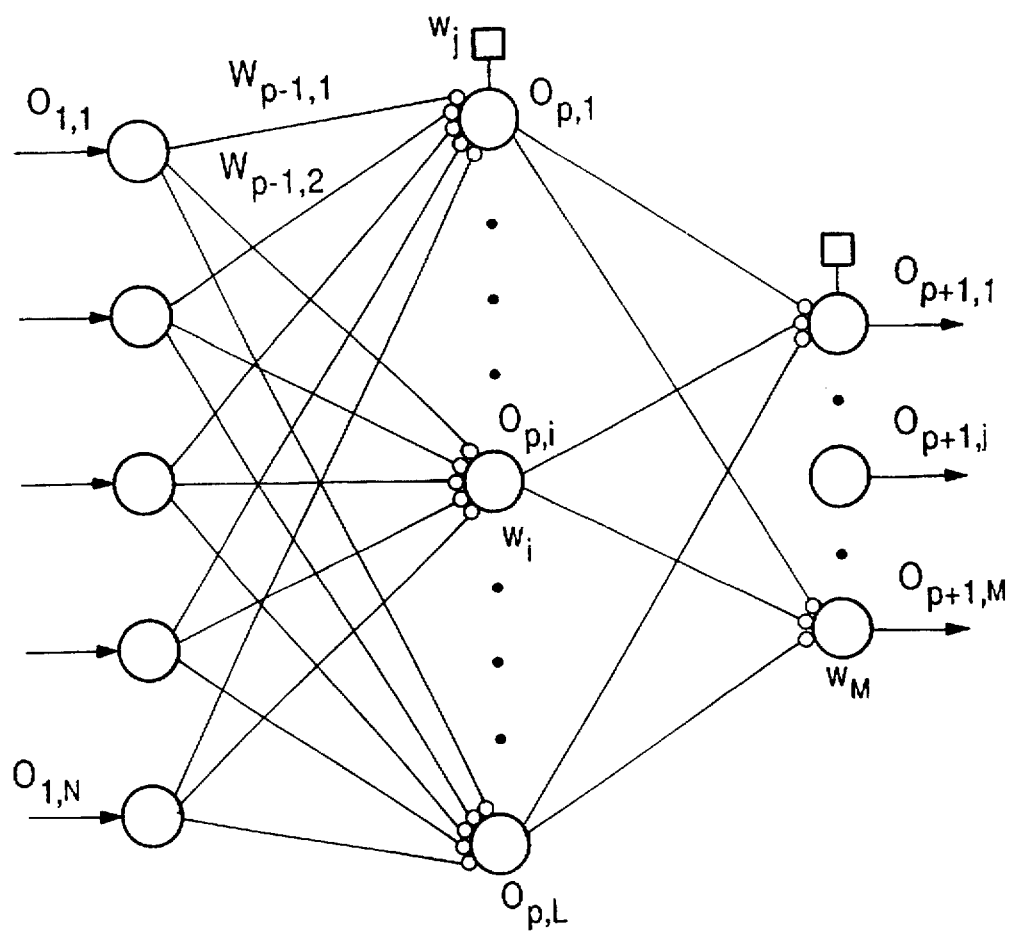
FIG. 15 shows an example of the NN model.
Figure 16:
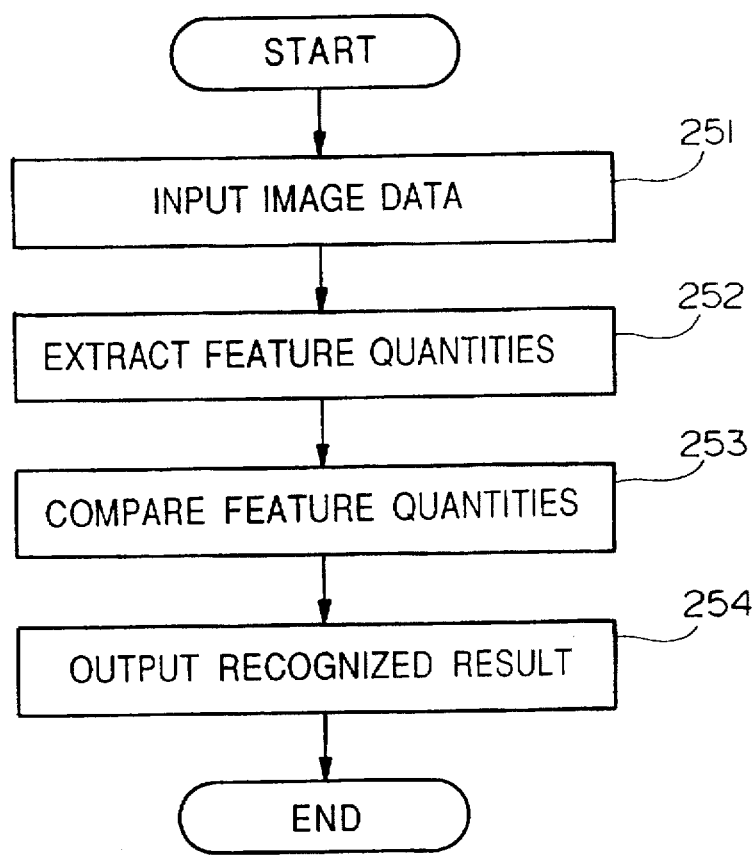
FIG. 16 is a flow chart showing a conventional procedure of pattern recognition and classification of images.

The learning and forecasting part 203 comprises the FNN model such as one shown in FIG. 15, which already learned with reference to the past radar images. The learning and forecasting part 203 gives the optimized weights transferred from the database 202 to the FNN model as initial values, and performs re-learning by using the radar image transferred from input section 100 and the past radar image transferred from the database 202. After re-learning, the learning and forecasting part 203 fixes the weights of the FNN model, and forecasts a radar image at any time after the measuring of the radar image. The forecast result is transferred to output section 300. In the output section 300, the result is shown in a display and the like.

If the measured radar image does not belong to any cluster as a result of the pattern recognition, a new cluster is added to the database. At this time, optimized weights of the FNN model for the added cluster are generated by, for example, performing a mean operation using the optimized weights of the other clusters. It is possible to judge whether a radar image belongs to any cluster or not by comparing the maximum degree of similarity to the existing clusters with a predetermined threshold value.

In addition, by previously designating an upper limit for the number of the clusters (i.e., the cluster number) for the pattern classification of radar images, and by varying the cluster number by using the learning function of the PNN model, it is possible to enlarge or reduce the size of the database which contains radar images, values of the weights for the FNN model after learning, etc. In this case, if a radar image which has not yet been registered in the database is input, a new cluster can be added within the limits up to the designated upper limit.

Figure 2:
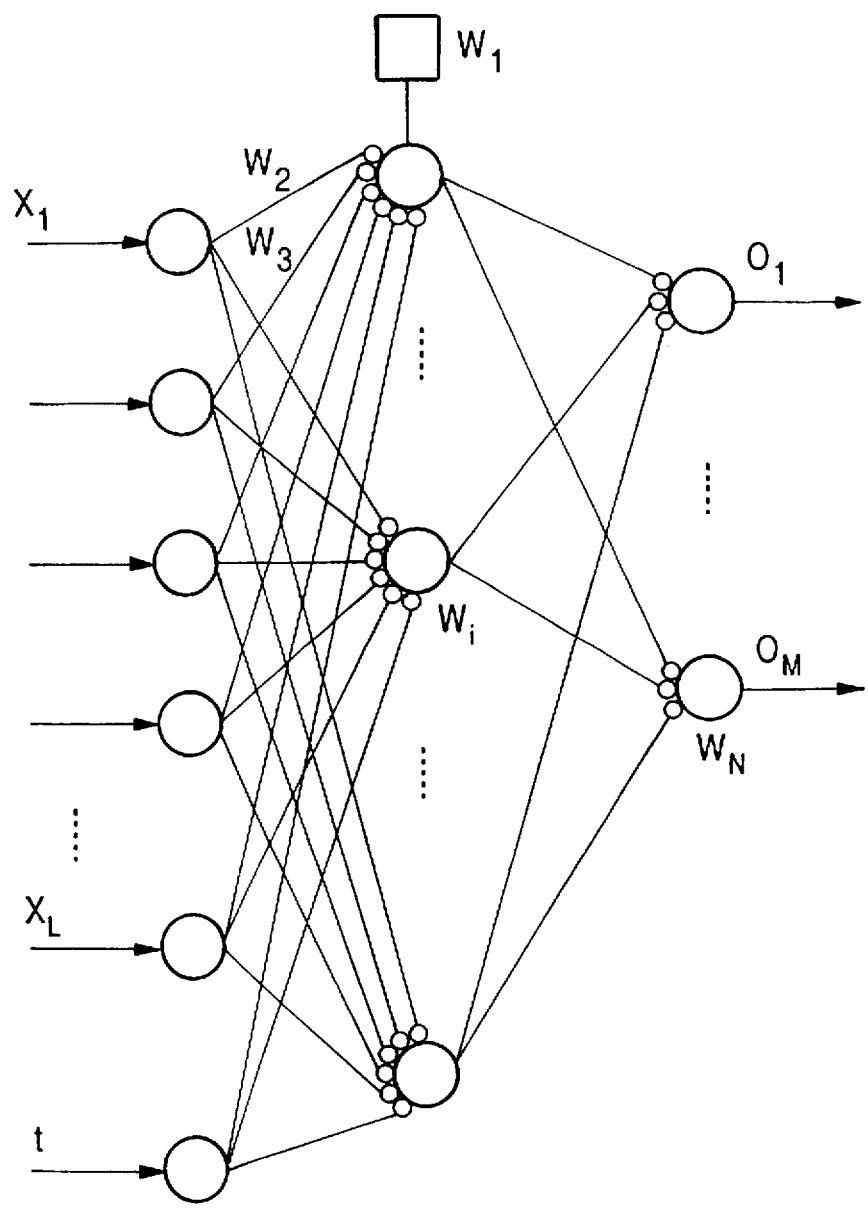
FIG. 2 shows the FNN model used in the weather forecast apparatus of the second embodiment according to the present invention.

Furthermore, if the size of the database is too enlarged, it is possible to reduce the cluster number by unifying the clusters whose radar patterns resemble each other.
Second Embodiment In this embodiment, information (t) relating to the forecast time is input to the input side of the FNN model in the weather forecast apparatus, as shown in FIG. 2. According to the time information, the FNN model can arbitrarily change the time intervals of mappings constructed between the input and the output of the model (that is, the time intervals of radar images between the input and the output).

If the hierarchical NN model is used as the FNN model of the weather forecast apparatus of the present embodiment, the input-output characteristic of a middle layer can be represented by the following equation, where t is an index of the forecast time for a radar image output from the FNN model.

$$y = f(x, t)$$
$$= 1/\{1 - \exp(-\Sigma w_i x_i - w_{i+1} t + b_i)\}$$

where $\Sigma$ means the summation at i=1 to L (L is the number of the units of the former layer).

Figure 3:
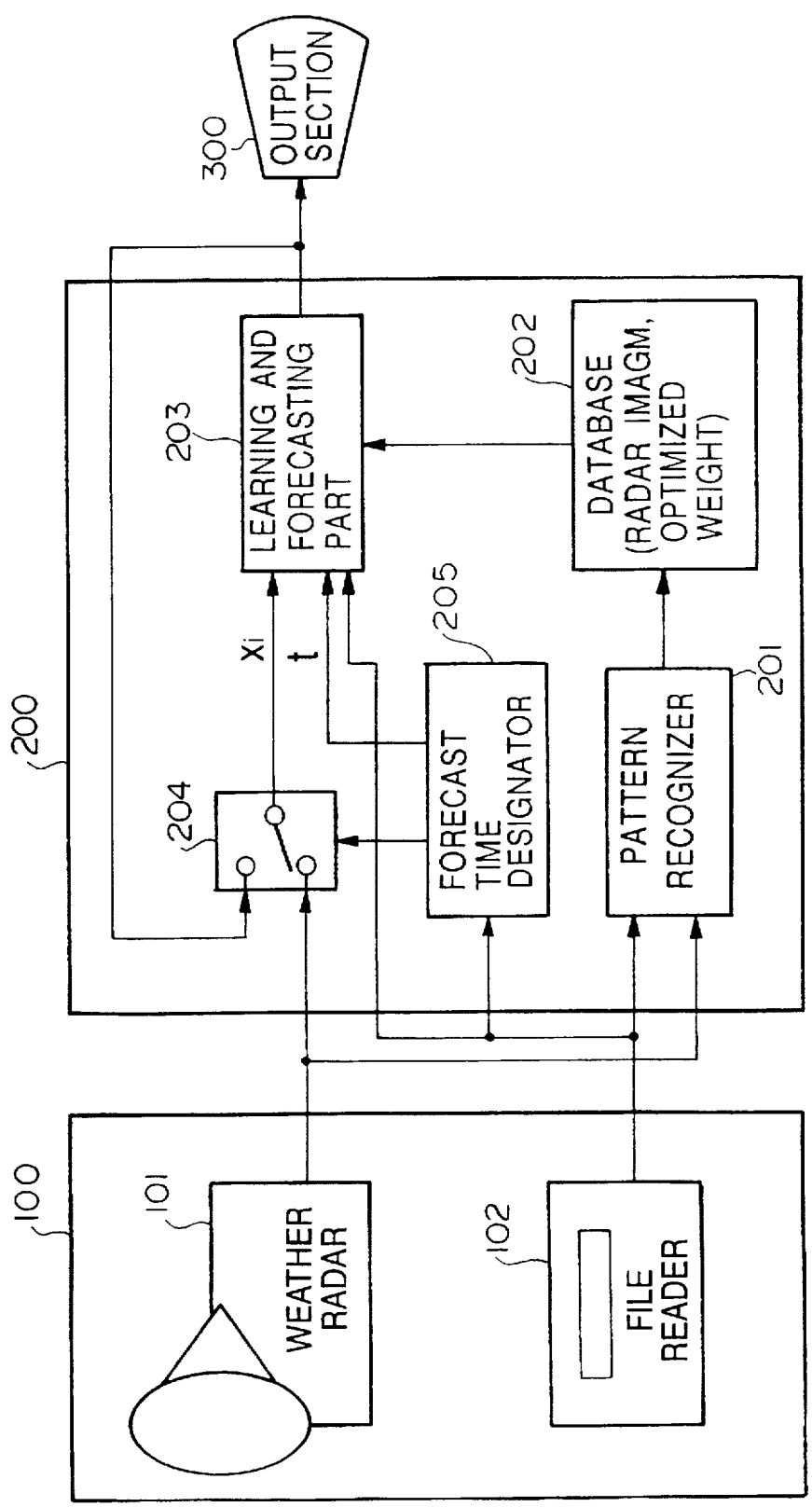
FIG. 3 is a block diagram showing the arrangement of the weather forecast apparatus of the second embodiment according to the present invention.

FIG. 3 is a block diagram showing the weather forecast apparatus of the present embodiment. In the figure, parts which are identical to those shown in FIG. 1 are given identical reference numbers. Reference numeral 204 indicates an input selector for changing radar images as an input, reference numeral 205 indicates a forecast time designator for designating a time at which the forecast is performed.

In case of this embodiment, input selector 204 is usually set so as to select the radar image measured by the weather radar 101 as the input for the learning and forecast section 203. The forecast time designator 205 provides information t relating to the forecast time to learning and forecasting part 203. As a result, the forecast of any future time corresponding to some times which are learned can be realized.

For example, in the case in which indexes which indicate forecast times of every five minutes from 5 to 30 minutes are given for the learning, the forecast result up to 30 minutes into the future can be obtained with one time input for the FNN model in the later forecast steps. In case of forecasting a radar image more than 30 minutes into the future, the radar image of 30 minutes into the future, which was forecasted by the learning and forecasting part 203, is provided to the same part 203 via input selector 204 and a next necessary forecast time is designated so as to repeat the forecast by the learning and forecasting part 203. In this way, a future radar image at any desired time can be forecast with a relatively small number of calculations.

In the weather forecast apparatus of the above first embodiment, the mappings between the input and output could be formed by the FNN model only at fixed intervals. For example, it is assumed that the learning was performed so as to output a future radar image at five minutes into the future with respect to the input radar image. In this case, for forecasting future radar images of 30 minutes and 2 hours into the future, 6 and 24 times of the cyclic operation via learning and forecasting part 203 and input selector 204 are needed, respectively.

In contrast, by using the weather forecast apparatus of the present embodiment for forecasting future radar images of 30 minutes and 2 hours into the future by using a model which learned with the maximum forecast time of 30 minutes, only 1 and 4 times of the cyclic operation via learning and forecasting part 203 and input selector 204 can realize the respective forecasted results.

By using the above stated embodiments, an application of forecasting the number of the sales of commodities can be realized by making the FNN model learn the sales results of commodities which are influenced by the weather as well as the radar image.

Third Embodiment

In this embodiment, the pattern recognition of radar images is effectively incorporated into the weather forecast apparatus which provides a weather radar image to the FNN model so as to make the model learn the weather dynamics and forecasts the weather such as rainfall and snowfall in a short time by using the FNN model after learning. Hereinbelow, a method of the pattern recognition and the apparatus for implementing such a method will be explained. The basic forecasting part based on the weather dynamics is similar to, for example, that of the above-mentioned U.S. Pat. No. 5,406,481; thus, the explanation for it will be omitted here.

Figure 4:
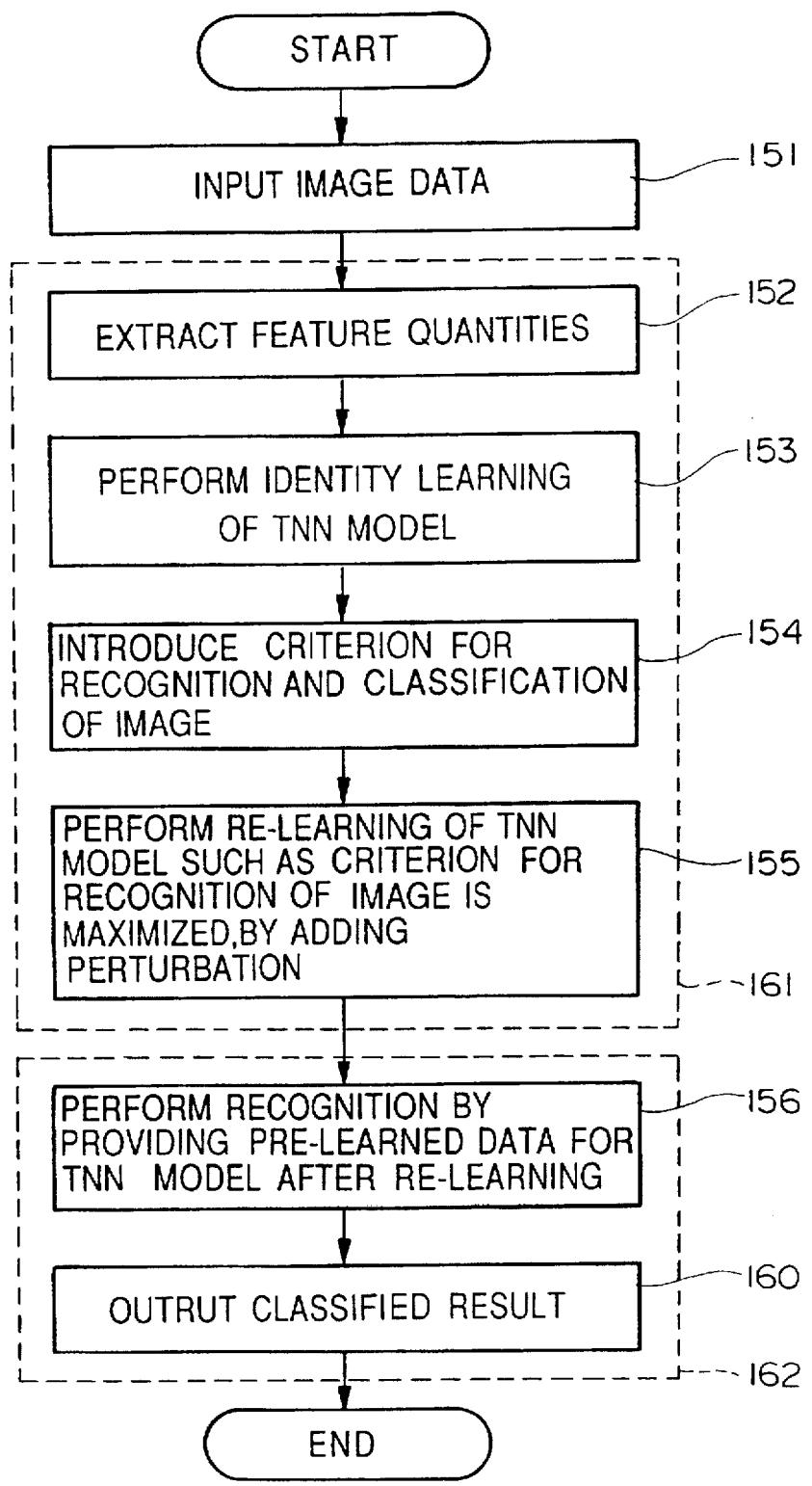
FIG. 4 is a flow chart showing the procedure of pattern recognition which is used in the third embodiment according to the present invention.

FIG. 4 is a flow chart showing the procedure of pattern recognition which is used in the third embodiment according to the present invention. The recognition method of this embodiment performs recognition and classification by using a TNN model. The steps of the procedure are roughly divided into three sections: data input section 151 for inputting radar images, learning section 161 in which learning and re-learning of the TNN model is performed, and classification section 162 in which feature quantities (calculated from pre-learned image data) are given to the TNN model after re-learning so as to recognize and classify the image.

First, image data are input (see step 151), and then learning section 161 is performed. In the learning section, feature quantities which are effective for the recognition and classification of the image are extracted from the image data (see step 152).

As the feature quantities, besides energy E, entropy H, correlation C, local homogeneity L, and inertia I, which were explained by using respective Equations (5)–(9), the following quantities are newly introduced.

(A) Feature quantity obtained by the gray level difference method (GLDM) (cf. Reference 4: J. S. Weszka, "A Comparative Study of Texture Measures for Terrain Classification", IEEE Trans. on Syst. Man. and Cybern., Vol. SMC-6, pp. 269–285, 1976)

With the gray level of the target pixel (n,m) as $g(n,m)$ and the gray level of the object pixel being distance $\delta$ away from this target pixel as $g(n+\Delta n, m+\Delta m)$, the gradient of gray level at this target pixel (n,m) is defined by the following equation.

$$g_\delta(n,m) = |g(n,m) - g(n+\Delta n, m+\Delta m)|$$

If the probability of the above gradient $g_\delta(n,m)$ being i is defined as $$\hat{f}(i|\delta) = P(g_\delta(n,m) = i)$$

contrast CON, angular second moment ASM, entropy ENT, mean MEAN, and inverse difference moment IDM can be obtained, as shown by Equations (20)–(24). These quantities will be used as the feature quantities.

$$CON = \sum_{i=0}^{M-1} i^2 \hat{f}(i|\delta) \tag{20}$$

$$ASM = \sum_{i=0}^{M-1} \hat{f}(i|\delta)^2 \tag{21}$$

$$ENT = \sum_{i=0}^{M-1} \hat{f}(i|\delta) \log \hat{f}(i|\delta) \tag{22}$$

$$MEAN = \sum_{i=0}^{M-1} i \hat{f}(i|\delta) \tag{23}$$

$$IDM = \sum_{i=0}^{M-1} \frac{\hat{f}(i|\delta)}{i^2 + 1} \tag{24}$$

(B) Feature quantity obtained by the gray level run length method (GLRLM) (cf. Reference 5: M. M. Galloway, "Texture an Analysis Using Gray Level Run Length", Comput. Graphic Image Processing, Vol. 4, pp. 172–179, 1975)

When it is assumed that the number of times of the existence of a run with gray level i and length j on an image is defined as $$r(i,j|\theta)$$

the following matrix with this definition as element (i,j) can be defined as follows.

$$R(\theta) = |r(i,j|\theta)|$$

By using this matrix $R(\theta)$, short run emphasis $RF_1\{R(\theta)\}$, long run emphasis $RF_2\{R(\theta)\}$, gray level distribution $RF_3\{R(\theta)\}$, run length distribution $RF_4\{R(\theta)\}$, run percentage $RF_5\{R(\theta)\}$, and the like can be obtained, as shown by Equation (25)–(29). These quantities will also be used as the feature quantities.

$$RF_1\{R(\theta)\} = \frac{\sum_{i=0}^{M-1}\sum_{j=0}^{M-1}\frac{\hat{r}(i,j|\theta)}{j^2}}{T_R} \quad (25)$$

$$RF_2\{R(\theta)\} = \frac{\sum_{i=0}^{M-1}\sum_{j=0}^{M-1}j^2\hat{r}(i,j|\theta)}{T_R} \quad (26)$$

$$RF_3\{R(\theta)\} = \frac{\sum_{i=0}^{M-1}\left\{\sum_{j=0}^{N_R}\hat{r}(i,j|\theta)\right\}^2}{T_R} \quad (27)$$

$$RF_4\{R(\theta)\} = \frac{\sum_{j=0}^{N_R}\left\{\sum_{i=0}^{M-1}\hat{r}(i,j|\theta)\right\}^2}{T_R} \quad (28)$$

$$RF_5\{R(\theta)\} = \frac{\sum_{i=0}^{M-1}\sum_{j=0}^{N_R}\hat{r}(i,j|\theta)}{T_R} \quad (29)$$

where $N_G$ is the total number of gray levels, and $N_R$ is the total number of run lengths with respect to matrix $R(\theta)$. In addition, $T_R$ is the total number of runs regardless of the length or the gray level, as follows.

$$T_R = \sum_{i=0}^{N_G-1}\sum_{j=0}^{N_R}N_R\hat{r}(i,j|\theta) \quad (30)$$

The feature quantity obtained by the GLRLM is particularly effective for systematic classification of cirrus clouds. In this embodiment, any other feature quantities than those stated here may also be used. It should be noted that the feature quantities to be extracted are selected such that the number of the selected feature quantities is the same as that of variables which are used for an evaluation criterion for recognition and classification of images, which will be explained later.

Next, feature quantities calculated from image data (referred to as "feature quantities 1", hereinafter) are provided as input and teacher data to the TNN model, and identity learning by using the TNN model is performed (see step 153). Here, with the output from the TNN model as $o_i$ and the teacher data as $t_i$, the TNN model is controlled to learn in order that the error "Error" shown by Equation (31) is minimized. Note that the number of the units in the output layer is N.

$$\text{Error} = \sum_{i=1}^{N}(o_i - t_i)^2 \quad (31)$$

Figure 5:
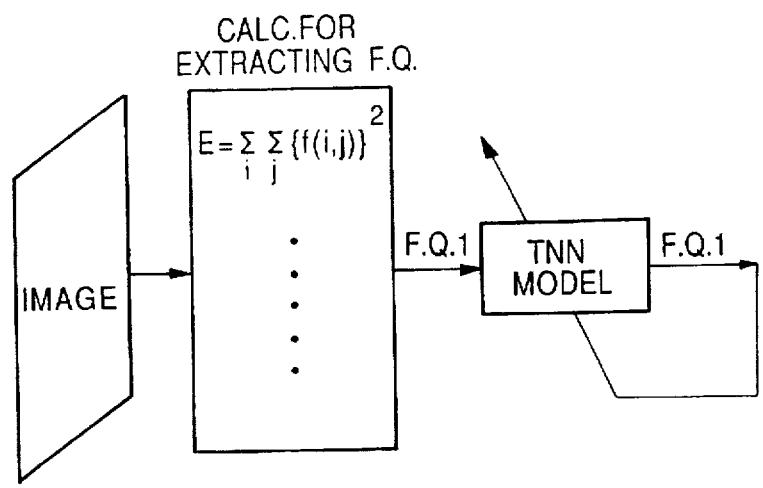
FIG. 5 is a conceptual view for explaining the identity learning of the TNN model in the third embodiment.

FIG. 5 is a conceptual view for explaining the identity learning of the TNN model. In the figure, the word "feature quantities" is abbreviated as "F.Q.". By the identity learning, such a calculation step as the feature quantities 1 obtained from the image are identically transformed into the feature quantities 1 themselves (this means the identity mapping) can be established. In this step, the number N of units in the output layer of the TNN model is set equal as the number of the variables necessary for calculating a value of the criterion.

Next, the criterion is introduced at the output side of the TNN model (see step 154). Here, Fisher's criterion in which the class of each image is estimated based on a covariance matrix with respect to input data is introduced as an example. In the present embodiment, other criteria than Fisher's can also be introduced.

With a vector having an element of each feature quantity calculated by the TNN model as o, and vector sets belonging to two classes as $(O_1^1, \ldots, O_{M_1}^1), (O_1^2, \ldots, O_{M_2}^2)$ Fisher's criterion can be represented by the following equation.

$$F = \frac{z^t S_B z}{z^t S_w z} \quad (32)$$

where $$\mu_k = \frac{\sum_{n=1}^{M_k} O_n^k}{M_k}$$

$$S_B = (\mu_1 - \mu_2)(\mu_1 - \mu_2)^t$$

$$S_k = \sum_{m=1}^{M_k}(O_m^k - \mu_k)(O_m^k - \mu_k)^t$$

$$S_w = S_1 + S_2$$

$$z = S_w^{-1}(\mu_1 - \mu_2)$$

In this criterion, larger estimated value F makes the separation of data on a given feature space (where the feature quantity vectors exist) easier. Therefore, in this embodiment, by performing re-learning of the TNN model so that estimated value F (i.e., Fisher's criterion) could be maximized, a TNN model by which more effective feature quantities can be extracted is constructed (see step 155). Hereinbelow, the re-learning of the TNN model will be explained in detail.

For making the TNN model re-learn, the following partial differential value of the Fisher's function with respect to weight $W_{j,i}$ is necessary.

$$\frac{\partial F}{\partial W_{j,i}}$$

However, it is often difficult to analytically calculate the formula of such a partial differential. Therefore, the use of a perturbation method may be considered, in which some perturbation is added to the weight, and from the corresponding increase or decrease of criterion F, it is determined whether or not the weight is to be renewed. However, the following amount of calculation is necessary from the addition of the perturbation to the weight up to the renewal of the weights. Here, the output feature quantities from the TNN model are generally termed "feature quantities 2".

(Amount of calculation necessary for obtaining feature quantities 2 by forward-calculation when providing feature quantities 1 to the TNN model to which perturbation was added)+(Amount of calculation necessary for calculating the criterion for the recognition and classification of the image)

On the other hand, if adding some perturbation to feature quantities 2 obtained as output values from the TNN model, and renewing the weight according to this, the following amount of calculation is necessary.

(Amount of calculation necessary for calculating the criterion from feature quantities 2)+(Amount of calculation necessary, only in the case that the criterion is maximized or minimized, for obtaining a correction amount for the weight by back-propagating the amount of the perturbation which was added to feature quantities 2)

Figure 6:
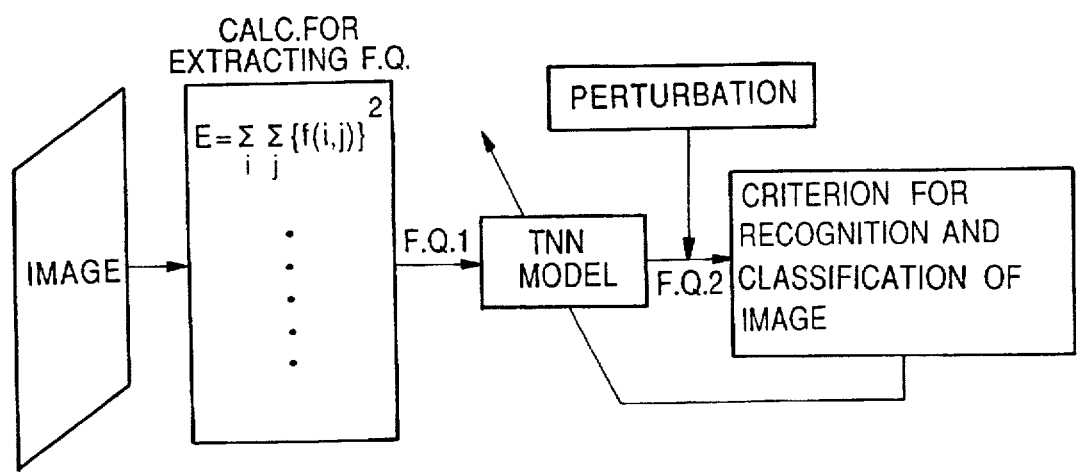
FIG. 6 is a conceptual view for explaining the re-learning of the TNN model.

In the case of using the former method, the whole calculation must be performed every time the perturbation is added. In contrast, in the case of the latter method, the calculation of the back-propagation of the amount of perturbation must be performed only when the criterion is increased (or decreased at the case of minimization); thus, the amount of calculation necessary for the renewal of the weight is decreased. Accordingly, in this embodiment, the latter method is adopted. FIG. 6 is a conceptual view for showing the concept of this renewal method, that is, the re-learning of the TNN model in the present embodiment.

Next, a method for back-propagating the amount of perturbation will be examined. That is, it will be examined to calculate the variation of the Fisher's criterion (Equation (32)) and to back-propagate the variation (cf. a book for reference: D. E. Rumelhart and J. K. McClelland, "Parallel Distributed Processing", MIT Press, 1986).

With feature quantities 2 output from jth unit of the TNN model as $o_j$, and adding small perturbation $\epsilon_{p,j}$ to $o_j$, and difference dif $f(\epsilon_{p,j})=F_1-F_2$ is calculated, where $F_1$ is the estimated value in case of no perturbation, while $F_2$ is the estimated value in case of adding perturbation. If dif $f(\epsilon_{p,j})<0$ (or $f(\epsilon_{p,j})>0$ in case of the minimization of the estimated value), that is, if the estimated value is increased (or decreased in case of the minimization of the estimated value), a partial differential value represented by Equation (33) is calculated by back-propagating the amount of the perturbation. The partial differential value with respect to the units in the output layer can be obtained by the following Equation.

$$\frac{\partial dif f(\epsilon_{p+1,j})}{\partial W_{j,i}} \simeq \frac{\partial \epsilon_{p+1,j}}{\partial W_{j,i}} \quad (33)$$

$$= \frac{\partial \epsilon_{p+1,j}}{\partial o_{p+1,j}} \cdot \frac{\partial o_{p+1,j}}{\partial net_{p,j}} \cdot \frac{\partial net_{p,j}}{\partial W_{j,i}}$$

$$\simeq \epsilon_{p+1,j} \cdot f'(net_{p,j}) \cdot o_{p,i}$$

$$= \epsilon_{p+1,j} \cdot (1-o_{p+1,j}) \cdot o_{p+1,j} \cdot o_{p,i}$$

where $$net_{p,j} = -\sum_i W_{j,i} o_{p,i} + w_j \quad (34)$$

Here, the amount of back-propagation is defined as follows.

$$\delta_{p+1,j} = \epsilon_{p+1,j} f'(net_{p+1,j}) \quad (35)$$

By further back-propagating this amount, the following recursion formula can be obtained. Here, k represents the whole of the units which receive the output from unit j in a middle layer.

$$\delta_{p,j} = f'(net_{p,j}) \sum_k \delta_{p+1,k} W_{k,j} \quad (36)$$

By using this, the partial difference in connection with the weight which belongs to the unit of the middle layer can be calculated by Equation (37).

$$\frac{\partial dif f(\epsilon_{p+1,j})}{\partial W_{j,i}} \simeq \epsilon_{p,j} \cdot \delta_{p,j} \cdot o_{p,i} \quad (37)$$

Here, based on the amount of the back-propagation obtained by Equations (33) and (37), the weight is renewed by the following equation, where k means the number of repetitions and η means a rate for learning.

$$W(k+1)_{ij} = W(k)_{ij} + \eta \cdot \frac{\partial dif f(\epsilon_{p,j})}{\partial W(k)_i} \quad (38)$$

By the above-explained learning, the step of transformation from feature quantities 1 extracted from an image to feature quantities 2 being effective by the pattern recognition and classification of the image is established.

The learning section 161 is performed as explained above, and the learning and re-learning of the TNN model is realized.

Figure 7:
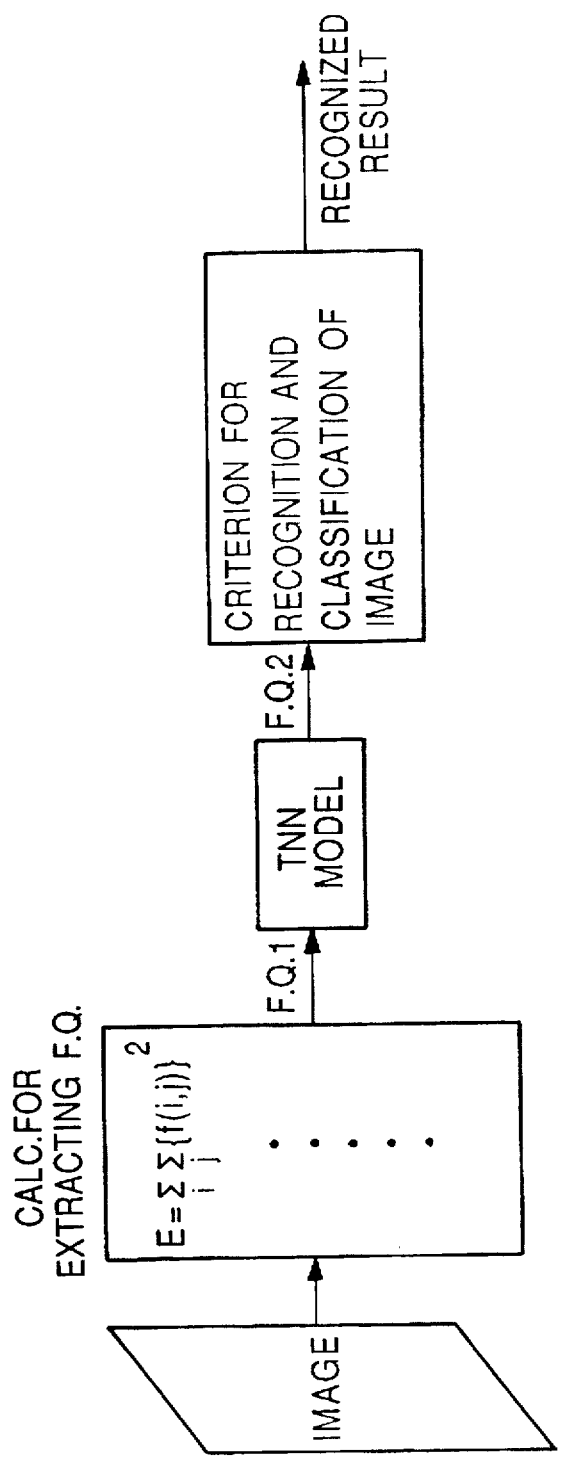
FIG. 7 is a conceptual view for explaining the pattern recognition and classification of an image by using the TNN model after re-learning.

Hereinbelow, the classification section 162 will be explained. In this section, feature quantities 1 are extracted from pre-learned image data, i.e., image data which will be practically pattern-recognized and classified. These extracted feature quantities are then input into the TNN model in which the re-learning was performed in learning section 161. Then, from feature quantities 2 which are output from the TNN model, estimated value F is computed based on the above-explained criterion so as to recognize and classify the pattern of the image (see step 156). After that, the classified result is output (see step 160), and now all sequential steps are completed. FIG. 7 is a conceptual view for explaining the pattern recognition and classification of the image by using the TNN model after re-learning.

The pattern recognition method used in the present embodiment has been explained above. Next, a radar image feature quantity extracting apparatus for implementing the method will be explained with reference to FIG. 8. In the figure, parts which are identical to those shown in FIG. 1 are given identical reference numbers. In this apparatus, data processor 400, including a TNN model, for performing the pattern recognition and classification of radar images according to the method of the present invention is provided.

The data processor 400 comprises feature quantity calculator 401 for calculating and extracting feature quantities 1 calculated in the feature quantity calculator 401 from the input radar image; feature quantity transformer 402, including the TNN model, for providing the feature quantities 1 calculated in the feature quantity calculator 401 to the TNN model so as to transform them to be output as feature quantities 2; estimator 403 for estimating the class (or the kind) of the image based on the feature quantities 2 output from the feature quantity transformer (the TNN model) 402; learning controller 404 for making the feature quantity transformer 402 learn; and perturbation generator 405 for generating perturbation which is used for the learning.

As the TNN model included in feature quantity transformer 402, the above-stated hierarchical model may be used. The estimator 403 introduces a criterion of the image recognition and classification for feature quantities 2 output from the TNN model and classifies images for each class. For example, the estimator outputs estimated value F based on the above-stated Fisher's criterion. In output section 300, the recognized and classified results and the like are displayed.

Next, the pattern recognition and classification of radar images by using this radar image feature quantity extracting apparatus will be explained. For performing such pattern recognition and classification by using this apparatus, the learning of the TNN model in the feature quantity transformer 402 must be previously performed via learning controller 404. Therefore, the operation at the learning will be explained, here.

First, a radar image and so on are read from input section to be transferred to data processor 400. In addition, data required for the learning of the NN model, such as a rate for learning, are previously transferred from file reader 102 to feature quantity transformer 402. Subsequently, feature quantities such as energy, entropy, correlation, and so on are calculated as image patterns by using feature quantity calculator 401, and the calculated quantities are transferred to feature quantity transformer 402.

The learning of the TNN model can be classified into the first learning and the re-learning. In case of performing the first learning, identity mappings of feature quantities 1 which are sent from feature quantity calculator 401 are learned. That is, the learning is performed in a manner such that feature quantities 1 from feature quantity calculator 401 are given as input and teacher data and the error of the output from the TNN model with respect to the teacher data (i.e., given feature quantities 1) is minimized by means of the back-propagation. The re-learning is subsequently performed after the first learning.

At the re-learning, feature quantity transformer 402 inputs feature quantities 1, which are transferred from the feature quantity calculator 401, into the TNN model, and transforms those into feature quantities 2 by a one-time forward calculation. The feature quantity transformer then transfers the feature quantities 2 to estimator 403 so as to calculate an estimated value.

On the other hand, some perturbation based on, for example, random numbers is generated by perturbation generator 405 in accordance with learning controller 404, and the generated perturbation is added to the output from the TNN model. Such perturbation-added feature quantities are also transferred to estimator 403, and the estimated value is calculated. If the estimated value after adding the perturbation is larger (or smaller) than that before the addition of the perturbation, the weights of the TNN model are renewed. By repeating such a re-learning operation, a feature quantity calculation procedure which is more suitable for classifying patterns can be established in the TNN model.

When completing the learning of the TNN model as stated above, practical pattern recognition and classification of a radar image is performed. First, a pre-learned radar image is read from input section 100, and the image is transferred to the data processor 400 where feature quantities 1 are extracted from the image data. The extracted feature quantities 1 are transferred to feature quantity transformer 402 to be input into the TNN model. The feature quantities 2 output from the TNN model are transferred to estimator 403. The estimator 403 judges which class the image belongs to. The result of such judgment is output into the output section 300. By the above-explained operations, the pattern recognition and classification of the pre-learned image is completed. By utilizing such recognition and classification, the forecasting with respect to the rainfall, snowfall and the like can be improved.

Fourth Embodiment

In this embodiment, systematic classification of radar images is effectively incorporated into the weather forecast apparatus which provides a weather radar image to the FNN model so as to make the model learn the weather dynamics and forecasts the weather such as rainfall and snowfall in a short time by using the FNN model after learning. Hereinbelow, a method of the systematic classification and the apparatus for implementing such a method will be explained. The explanation of the basic forecasting part based on the weather dynamics will be omitted here, as it was in the third embodiment.

Figure 9:
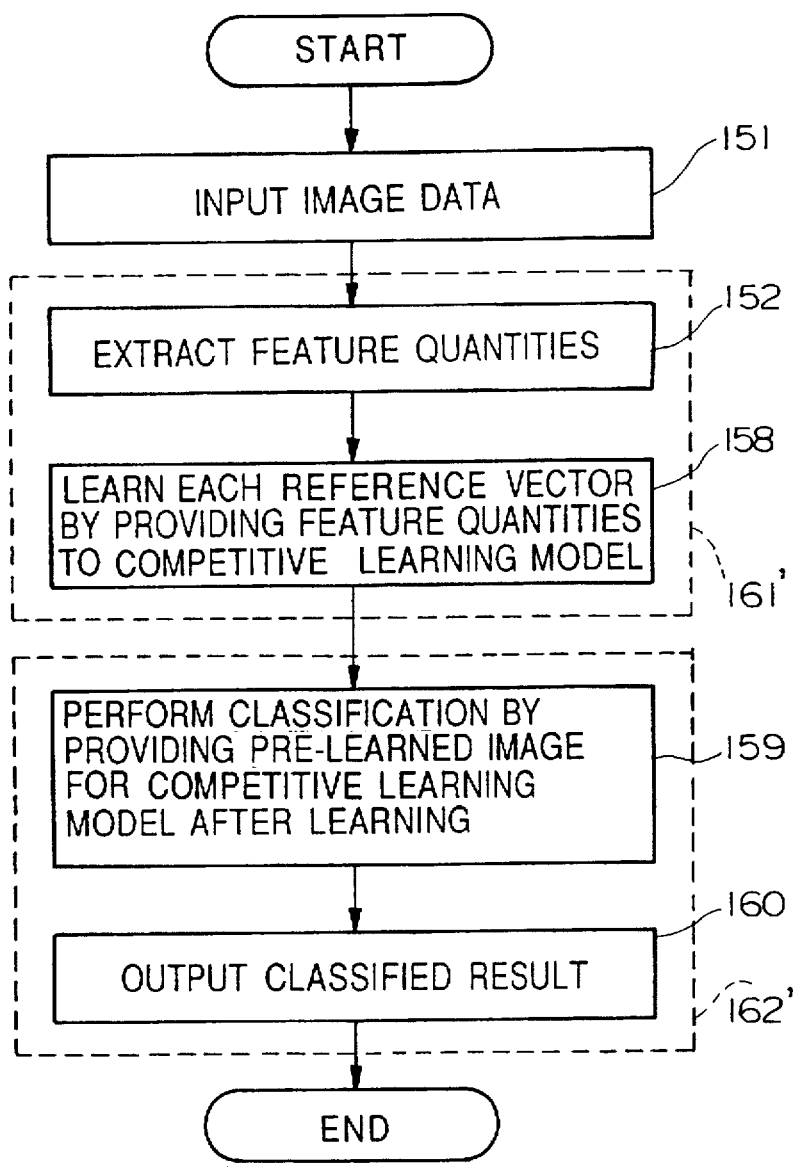
FIG. 9 is a flow chart showing the procedure of the systematic classification of images, which is used in the fourth embodiment.

FIG. 9 is a flow chart showing the procedure of the systematic classification of images, which is used in this fourth embodiment. In the figure, steps which are identical to those shown in FIG. 4 are given identical reference numbers.

Figure 17:
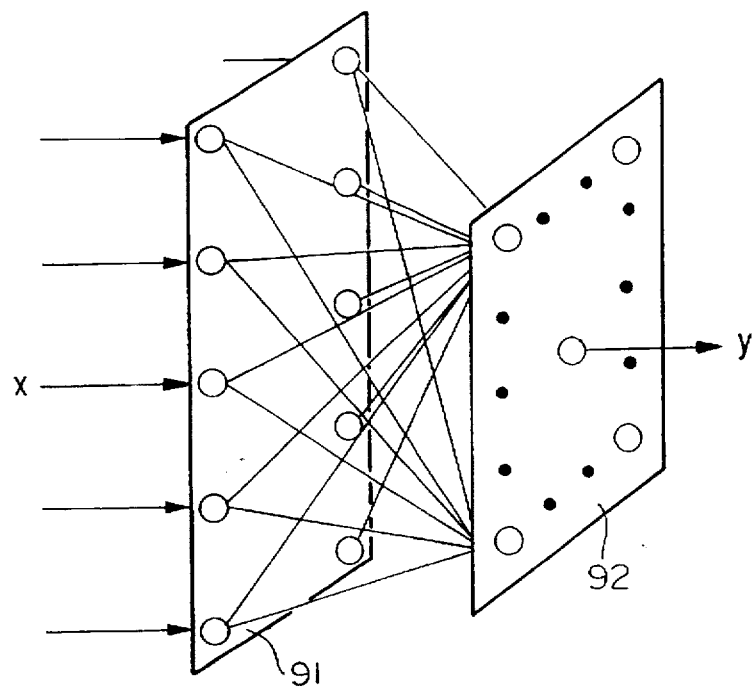
FIG. 17 shows an example of the competitive learning model.
Figure 18:
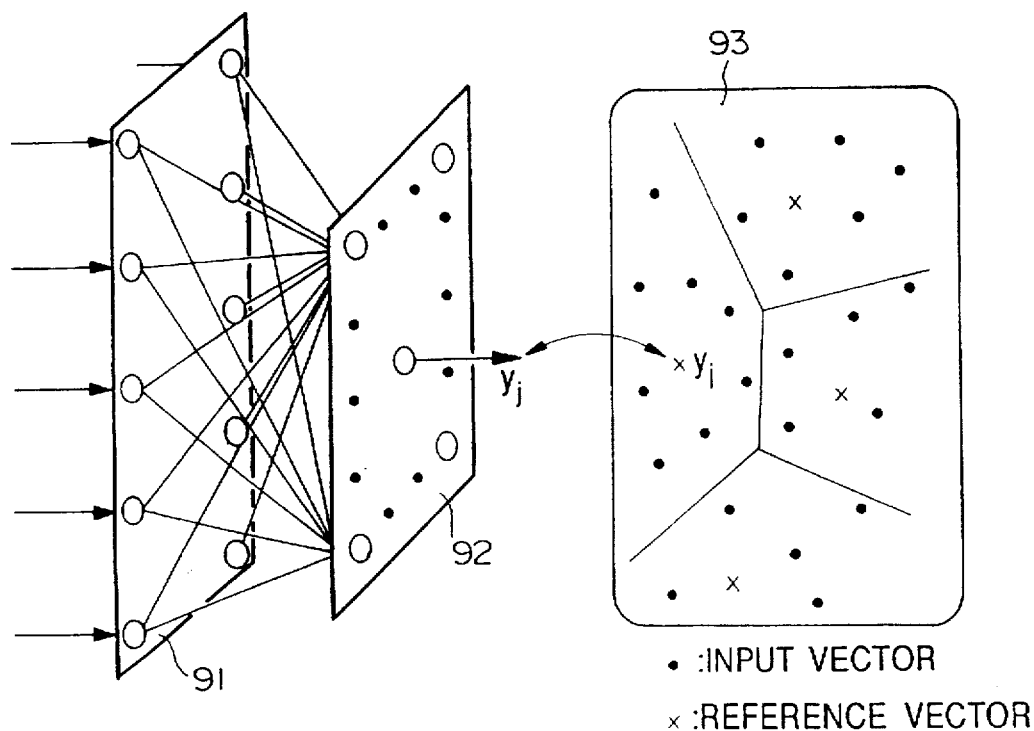
FIG. 18 shows the relationship between the competitive learning model, reference vectors, and clusters.

The classification method of this embodiment systematically classifies image patterns by using a competitive learning model which is a kind of the PNN models. The steps of this method are roughly divided into three sections: data input section 151 for inputting radar images, learning section 161' in which learning of the competitive learning model is performed, and classification section 162' in which image data which are not yet learned are introduced into the competitive learning model after learning, so as to systematically classify the image. As the competitive learning model, one which was explained with reference to FIG. 17 can be used as it stands.

First, the input of image data is performed (see step 151), and then learning section 161' is performed. At the first of the learning section, feature quantities are extracted from the image data (see step 152). In this embodiment of processing weather radar images, any feature quantities as stated in the third embodiment can be used for the purpose of extracting a feature as a pattern such as cirrus clouds and clouds accompanying a rotating low pressure system, which are seen in typhoons; furthermore, features of moving directions or speed of clouds may also be extracted. Some of the feature quantities may be chosen according to on which view-point the systematic classification of images is performed. The feature quantities stated in the third embodiment can be extracted from one image. However, for example, for extracting the moving direction or speed of clouds as feature quantities from a radar image, those extracted from more than two images must be used. In this embodiment, the following feature quantities by using a cross correlation method, which will be explained below, are used.

Figure 10:
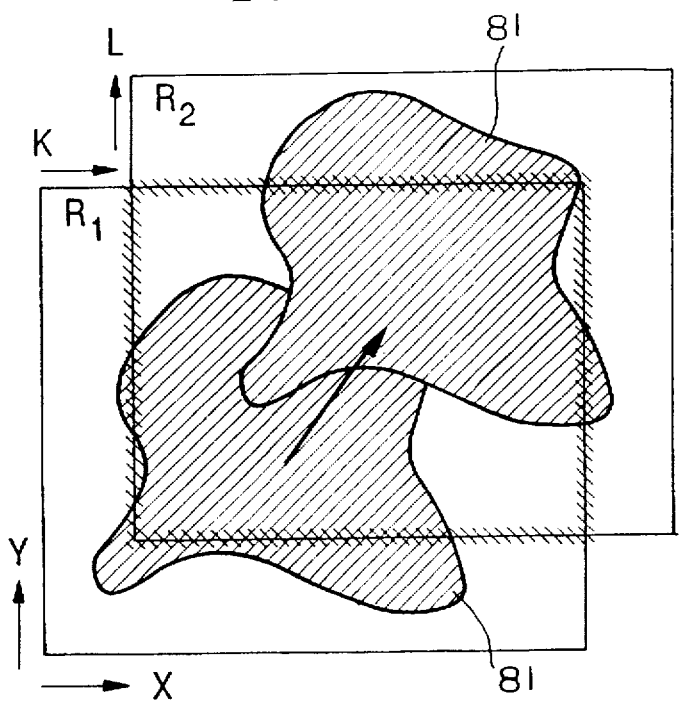
FIG. 10 is a conceptual view for explaining the method for finding a cross correlation value.

(C) Feature quantities representing the moving direction and speed of an object, obtained by using the cross correlation method Here, a case of extracting the moving direction and speed of clouds which are recorded in a weather radar image will be explained as an example. As shown in FIG. 10, a cross correlation value $\sigma_{K,L}$ is computed by the next equation in accordance with two weather radar images $R_1$ and $R_2$ which were observed with an interval of time $\Delta t$. Here, gradation of the lattice point (i,j) on the radar image, that is, intensities of the rainfall and snowfall are defined as $R_{1,i,j}$ and $R_{2,i,j}$, respectively, and the area for examining correlation and the difference of the two radar images for finding a correlation value are defined as (M,N) and (k,l), respectively. In FIG. 10, the rectangle with short slanted lines indicates the area for examining correlation, and the center bold arrow indicates the moving direction of rain cloud 81.

$$\sigma_{k,l} = \frac{\sum_{i=1}^{M} \sum_{j=1}^{N} R_{1,i,j} R_{2,i+k,j+l} - MN \overline{R_1} \overline{R_2}}{\sqrt{\left( \sum_{i=1}^{M} \sum_{j=1}^{N} R_{1,i,j}^2 - MN \overline{R_1}^2 \right) \left( \sum_{i=1}^{M} \sum_{j=1}^{N} R_{2,i,j}^2 - MN \overline{R_2}^2 \right)}} \quad (39)$$

$$\overline{R_1} = \frac{\sum_{i=1}^{M} \text{sum}_{j=1}^{N} R_{1,i,j}}{MN} \quad (40)$$

$$\overline{R_2} = \frac{\sum_{i=1}^{M} \text{sum}_{j=1}^{N} R_{2,i+k,j+l}}{MN} \quad (41)$$

Figure 11:
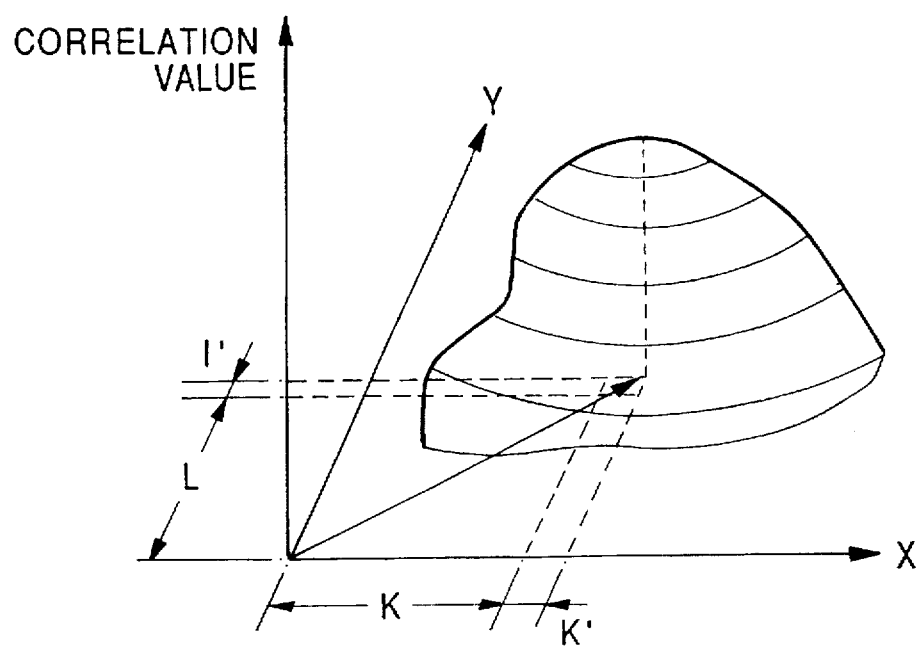
FIG. 11 shows an example of the distribution of correlation values.

The cross correlation value obtained by the above calculation indicates, for example, a distribution shown in FIG. 11. Here, with respect to the maximum cross correlation value $\sigma_{K,L}$ at lattice point (K,L) and other four cross correlation values $\sigma_{-x}, \sigma_{+x}, \sigma_{-y}, \sigma_{+y}$ at four neighboring points of the above lattice point, interpolation with a quadratic function is performed according to the following equation to find a difference (k',l') between lattice point (K,L) and a point (not always a lattice point) with a maximum cross correlation after the interpolation.

$$k' = \frac{\sigma_{-x} - \sigma_{+x}}{2(\sigma_{-x} - 2\sigma_{K,L} + \sigma_{+x})} \quad (42)$$

$$r = \frac{\sigma_{-y} - \sigma_{+y}}{2(\sigma_{-y} - 2\sigma_{K,L} + \sigma_{+y})} \quad (43)$$

Figure 12:
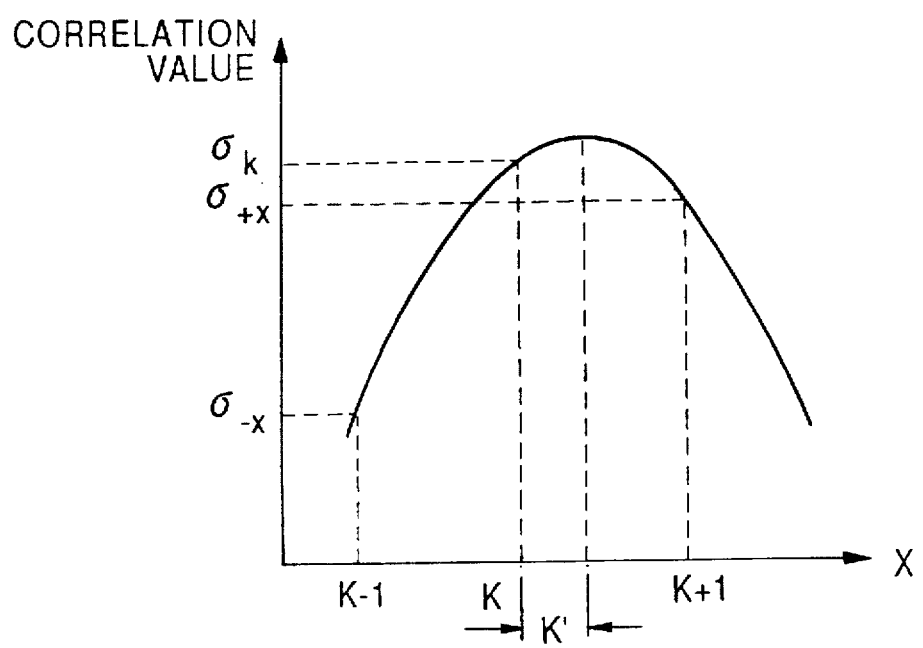
FIG. 12 is for the purpose of explaining the method for finding a point with the maximum value according to the distribution of correlation values, by using quadratic interpolation.

FIG. 12 is for the purpose of explaining this interpolation calculation. In this figure, for the sake of clarity, only the X-direction is shown.

As a result, the above two images have a maximum cross correlation value when these are (K+k', L+l') away from each other. Accordingly, moving vector ($V_x$, $V_y$) of rain cloud 81 can be obtained by the following equation. This vector quantities mean the moving direction and speed of the rain cloud 81.

$$V_x = \frac{(K + k')\Delta x}{\Delta t} \quad (44)$$

$$V_y = \frac{(L + l')\Delta y}{\Delta t} \quad (45)$$

Figure 13:
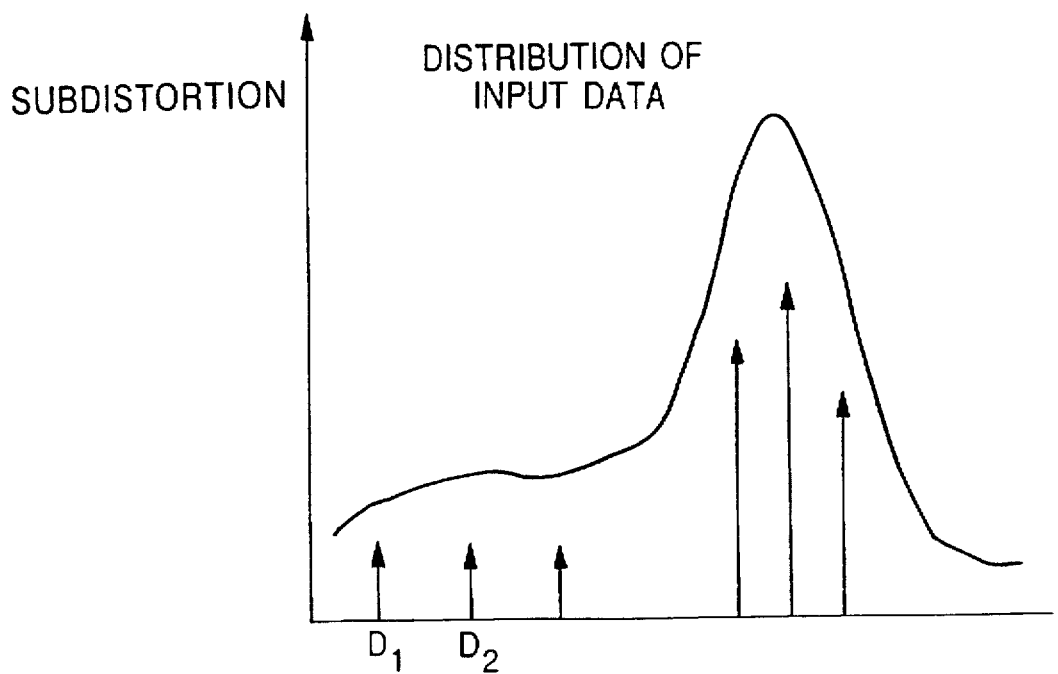
FIG. 13 is a conceptual view for explaining the state in which each subdistortion has deviation.

After extracting the feature quantities as stated above, these feature quantities are given as input data to a competitive learning model to make the model learn with no-teacher learning rules, and each reference vector is self-organized (see step 158). If the above-mentioned Ueda learning rules are used for the learning, after ranking the reference vectors according to each subdistortion, the reference vectors with the highest and lowest subdistortions are alternatively selected to determine the reference vectors to be selected. However, as the case shown in FIG. 13, that is, if the distribution of the input data has deviation and the distribution of values of the subdistortions also has deviation, many repetitions are necessary until the selection is completed.

Therefore, a more simple selective algorithm, and an algorithm for minimizing sum G of all subdistortions (see Equation (16)) will be examined.

First, the former will be examined. The reference vectors with the minimum subdistortion is selected to be rearranged in the neighborhood of the reference vector with the maximum subdistortion. Such a rearrangement operation is completed when the variance $\sigma_D[m]$ (see the following equation) of the distribution of the subdistortions goes below a predetermined value ε. That is, the selection is completed when the subdistortions of the reference vectors are equalized. In the following equation, $\upsilon_D[m]$ represents a mean value. At the end of the selection, each subdistortion has a minimum value.

$$\sigma_D[m] = \sum_j (D_j[m] - \upsilon_D[m]) \quad (46)$$

$$\upsilon_D[m] = \sum_j D_j[m]$$

Next, an algorithm for minimizing sum G of all subdistortions will be examined.

With each reference vector as $\{y_j, j=1, \ldots, N\}$ and each subdistortion belonging to the reference vector as $\{D_j, j=1, \ldots, N\}$, a space constructed by these subdistortions is assumed. In this case, distortion G can be defined with respect to the points $$D=(D_1, \ldots, D_N)$$

in the space.

For minimizing this, the partial difference of distortion G with respect to ith element $y_{i,j}$ of reference vector $y_j$ is found according to the following equation.

$$\frac{\partial G}{\partial y_{j,i}} = \frac{\partial \sum_{z=1}^N D_z}{\partial y_{j,i}}$$

$$= \frac{\partial D_j}{\partial y_{j,i}}$$

Here, according to the definition of the subdistortion as shown in Equation (17), the next equation can be obtained.

$$\frac{\partial G}{\partial y_{j,i}} = \frac{\partial \frac{1}{T} \sum_{x \in S_j} d(x, y_j)}{\partial y_{j,i}} \quad (47)$$

$$= \frac{1}{T} \sum_{x \in S_j} \frac{\partial d(x, y_j)}{\partial y_{j,i}}$$

$$= \frac{1}{T} \sum_{x \in S_j} (x_i - y_{j,i})$$

Therefore, the following method will be examined: the partial difference value of G with element $$\frac{\partial G}{\partial y_{j,i}}$$

is defined as $$\nabla G_j = \left( \frac{\partial G}{\partial y_{j,1}}, \frac{\partial G}{\partial y_{j,2}}, \ldots, \frac{\partial G}{\partial y_{j,N}} \right)^T \quad (48)$$

and quadratic partial difference matrix $B_j = \nabla^2 G_j$ with respect to each reference vector $y_j$ is considered, and its inverse matrix $H_j = B_j^{-1}$ is reconstructed by using $\nabla G_j$ and D so as to renew reference vector $y_j$. Here, with the repetition number of the competitive learning model as m, the following amounts are defined.

$$s(m)=D(m+1)-D(m)$$

$$r(m)=\nabla G_j(m+1)-\nabla G_j(m)$$

The renewal of approximate quadratic partial difference matrix H can be represented by the following equation by using a nonlinear optimizing method such as a BFGS method (cf. Reference 6: R. Fletcher, "Practical Method of Optimization", second ed., John Whiley & Sons, 1987) The BFGS method is used in the present embodiment, and a unit matrix is provided as an initial value of matrix H.

$$H_j(m + 1) = H_j(m) + \quad (49)$$

$$\left( 1 + \frac{r(m)^T H(m) r(m)}{s(m)^T r(m)} \right) \frac{s(m) s(m)^T}{s(m)^T r(m)} -$$

$$\left( \frac{s(m) r(m)^T H_j(m) + H_j(m) r(m) s(m)^T}{s(m)^T r(m)} \right)$$

According to this, renewal rules of the reference vector $y_j$ can be represented by the following equation.

$$y_j(m+1)=-H_j(m)\nabla G_j(m) \quad (50)$$

These renewal rules mean minimizing a quadratic form with metric $\nabla^2 G_j$ in the space of reference vector $y_j$.

By the above-explained renewal of the reference vectors, the learning section 161' is performed, and the learning of the competitive learning model is realized.

Hereinbelow, the classification section 162' will be explained. In this section, feature quantities are extracted from pre-learned image data. i.e.. image data to be systematically classified in practice. These extracted feature quantities are then input into the competitive learning model in which the learning was performed in learning section 161'. From all output units, one with the reference vector which is nearest with respect to the input vector is found, and according to this found unit, a class suitable for the image is judged to systematically classify the image (see step 159). After that, the classified result is output (see step 160), and now all sequential steps are completed.

Figure 8:
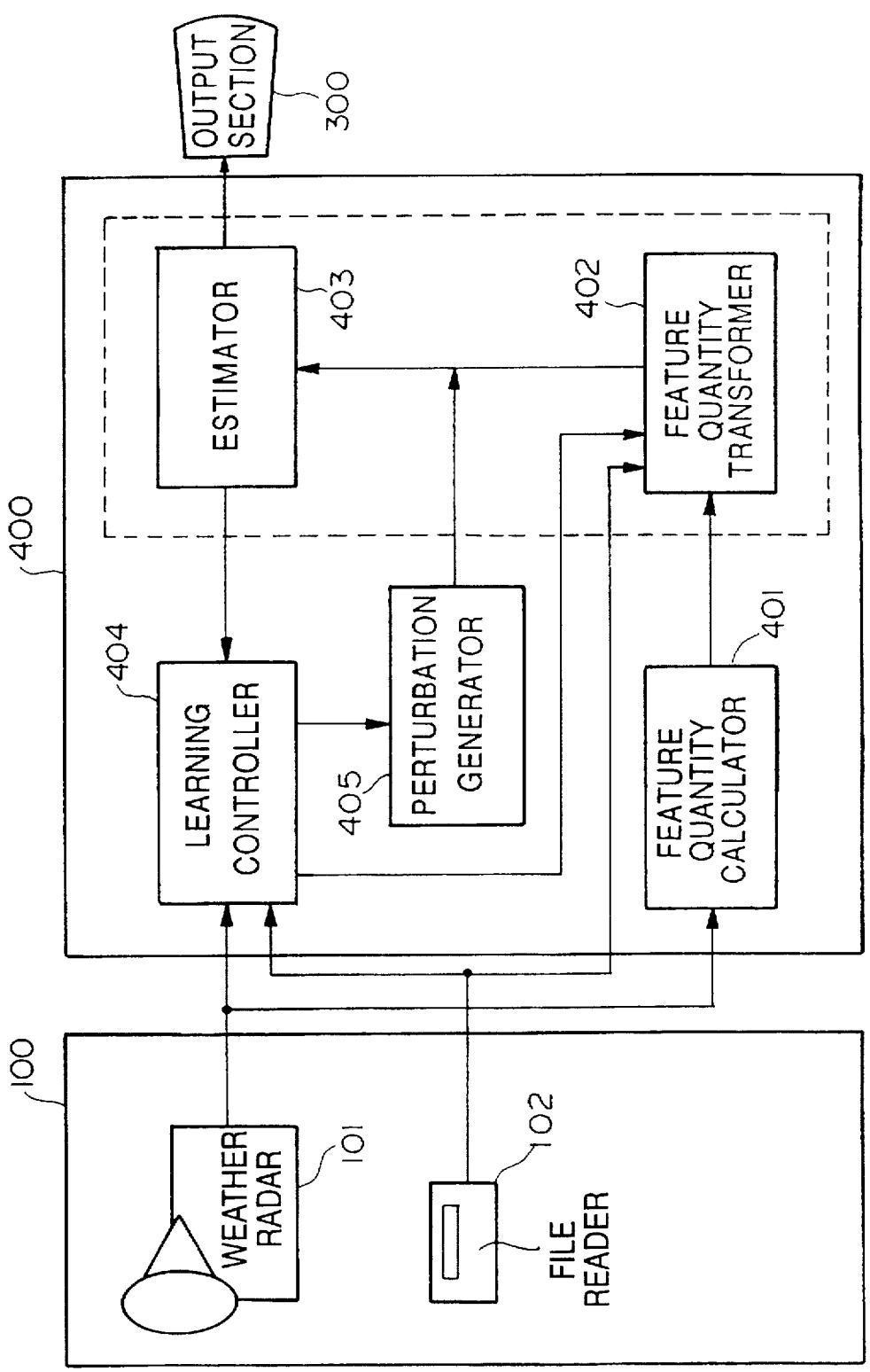
FIG. 8 is a block diagram showing the arrangement of the radar image feature quantity extracting apparatus in the third embodiment.
Figure 14:
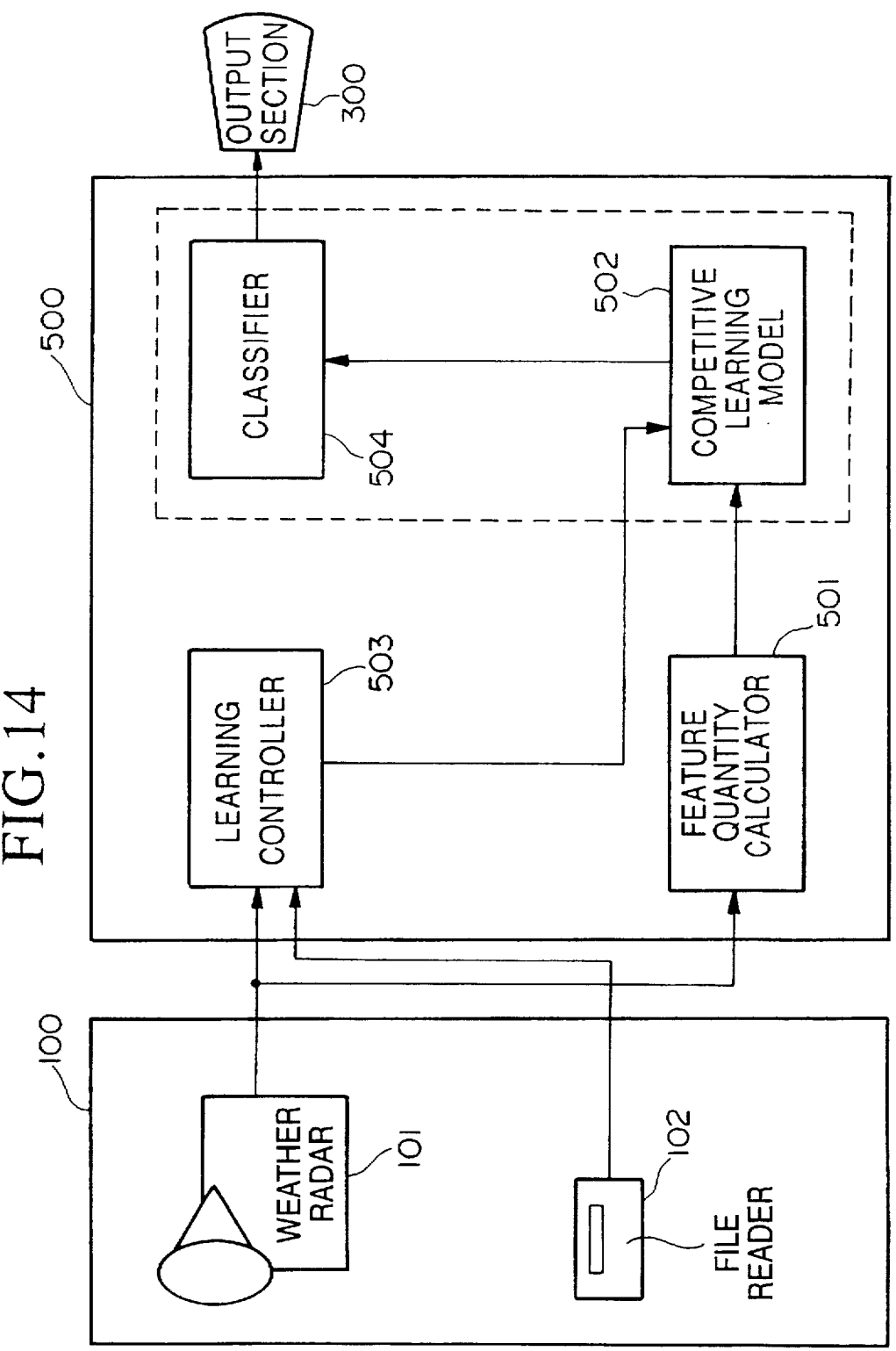
FIG. 14 is a block diagram showing the arrangement of the radar image classifying apparatus in the fourth embodiment.

The systematic classification method used in the present embodiment has been explained above. Next, a radar image classifying apparatus for implementing this classification method will be explained with reference to FIG. 14. In the figure, parts which are identical to those shown in FIG. 8 are given identical reference numbers. In this radar image classifying apparatus, data processor 500, including a competitive learning model, for performing the systematic classification of radar images according to the present invention, is provided.

The data processor 500 comprises feature quantity calculator 501 for calculating and extracting feature quantities from the input radar image; competitive learning model 502 for selecting, with the feature quantities as inputs, reference vectors having minimum distortion; learning controller 503 for making the competitive learning model learn by providing the feature quantities to the model; and classifier 504 for determining the class of the image based on the reference vectors selected by the competitive learning model 502 after learning.

Next, the systematic classification of radar images by using this radar image classification apparatus will be explained. For performing such a systematic classification by using the apparatus, the learning of the competitive learning model 502 must be previously performed via learning controller 503. Therefore, the operation at the learning will be explained here.

First, a radar image and so on are read from input section 100 to be transferred to data processor 500. In addition, data required for the learning of the competitive learning model, such as a rate for learning, are previously transferred from file reader 102 to feature quantity calculator 501. Subsequently, feature quantities as image patterns, such as energy, entropy, correlation, each amount according to the GLDM and the GLRLM, which are represented by the above Equations (5)–(9), (20)–29), (44), and (45) are calculated with respect to the image data by using feature quantity calculator 501, and the calculated quantities are transferred to the competitive learning model 502. Then, the learning of reference vectors is performed via the learning controller 503 according to Equation (49) and (50) so that the distortion could be minimized.

When completing the learning of the competitive learning model 502 as stated above, the systematic classification of images is practically performed. First, a pre-learned radar image is read from input section 100, and the image is transferred to the data processor 500, where feature quantities are extracted from the image data by the feature quantity calculator 501. The extracted feature quantities are transferred to the competitive learning model which selects reference vectors by which the distortion is minimized. Then, the classifier 504 assigns the class to which the selected reference vector belongs as a class for the image. The result of such classification is output into the output section 300. By the above-explained operations, the classification of the pre-learned image is completed. By utilizing such classification, the forecasting with respect to the rainfall, snowfall and the like can be improved.

What is claimed is:

1. A weather forecast apparatus that provides a weather radar image to an FNN model, which is a neural network model for learning and forecasting, so that the FNN model learns weather dynamics and forecasts weather after the learning, comprising:

pattern recognition means, including a PNN model, which is a neural network model for pattern classification, and is prepared based on classification criteria according to past radar images, for pattern-recognizing a measured radar image by providing the radar image to the PNN model to pattern-classify the radar image;

memory means for storing plural weights for the FNN model, which are determined based on past plural radar images, the memory means having clusters corresponding to each past radar image;

learning means, including the FNN model, for selecting a weight that corresponds to a pattern resembling the pattern of the measured radar image from among those stored in the memory means in accordance with the pattern-recognized result obtained by the pattern recognition means; setting the selected weight as an initial value of the FNN model; and making the FNN model re-learn; and forecast means for fixing the weights of the FNN model after the re-learning, and for forecasting and outputting a future radar image, wherein the learning means includes means for causing the FNN model to re-learn by providing the radar image, which was pattern-classified by the pattern recognition means, to the FNN model when the radar image belongs to an existing cluster, while generating a new cluster and weights which are most suitable for forecasting a weather pattern belonging to the new cluster when the radar image does not belong to an existing cluster.

2. A weather forecast apparatus as claimed in claim 1, wherein:

the memory means comprises a database for registering and managing the weights for the FNN model, which are generated by the learning means based on the pattern-recognized result obtained by the pattern recognition means, and the radar images used for the learning, and the size of the database is automatically enlarged or reduced by adding a cluster or unifying the clusters.

3. A weather forecast apparatus as claimed in any one of claims 1 or 2, further comprising:

means for providing indexes representing plural forecast times for the FNN model and making the FNN model learn so that the FNN model could output each radar image which corresponds to each time represented by each index; and means for outputting a radar image corresponding to any possible forecast time obtained by any combination of the plural forecast times, for providing radar images that correspond to each forecast time comprising the combination for the FNN model in sequence.

4. A weather forecast method for providing a weather radar image to an FNN model, which is a neural network model for learning and forecasting, so that the model learns weather dynamics and forecasts weather by using the FNN model after the learning, the method performing pattern recognition of the radar image by using a TNN model that is a neural network model for transforming feature quantities which were input into the TNN model, comprising the steps of:

calculating and extracting one or more feature quantities from a radar image;

providing the feature quantities extracted in the calculating and extracting step for the TNN model as input and teacher data, and learning identical transformation from the feature quantities to the feature quantities;

calculating an estimated value based on a criterion for recognition from the output feature quantities that were identically transformed and output from the TNN model;

adding perturbation to the output feature quantities;

performing re-learning of the TNN model such that the estimated value is maximized or minimized;

pattern-recognizing a pre-learned image by providing feature quantities calculated and extracted from the pre-learned image for the TNN model after the re-learning; and forecasting and outputting a future radar image based on result of the pattern recognition of the pre-learned image.

5. A weather forecast method as claimed in claim 4, wherein the criterion is such as to estimate a cluster of the radar image based on a covariance matrix.

6. A weather forecast method for providing a weather radar image to an FNN model, which is a neural network model for learning and forecasting, so that the model learns weather dynamics and forecasts weather by using the FNN model after the learning, the method performing systematic classification of the radar image by using a PNN model, which is a neural network model for pattern classification, and selects reference vectors based on input feature quantities, comprising the steps of:

calculating and extracting plural feature quantities from the radar image;

providing the feature quantities extracted in the calculating and extracting step for the PNN model, and performing learning of the PNN model by finding a minimum value of an object function such that the quantization error of each reference vector which belongs to each output unit of the PNN model is minimized;

classifying a pre-learned image by providing the feature quantities calculated and extracted from the pre-learned image for the PNN model after the learning; and forecasting and outputting a future radar image based on results of the classification of the pre-learned image.

7. A weather forecast method as claimed in claim 6, wherein the PNN model is a competitive learning model.

8. A weather forecast method as claimed in one of claims 4 or 6, wherein the feature quantities are selected from the group consisting of energy, entropy, correlation, local homogeneity, and inertia based on a co-occurrence matrix; contrast, angular second moment, entropy, mean, and inverse difference moment based on a GLDM; and short run emphasis, long run emphasis, gray level distribution, run length distribution, and run percentage based on a GLRLM.

9. A weather forecast apparatus for providing a weather radar image to an FNN model, which is a neural network model for learning and forecasting, so that the model learns weather dynamics and forecasts weather by using the FNN model after the learning, comprising:

feature quantity calculating means for calculating and extracting one or more feature quantities from a radar image;

a TNN model, which is a neural network model, for transforming and outputting the feature quantities that are input from the feature quantity calculating means;

perturbation generating means for generating an amount of perturbation;

means for calculating an estimated value from the feature quantities output from the TNN model, based on a criterion for recognition;

learning means for providing the feature quantities extracted by the feature quantity calculating means for the TNN model as input and teacher data, for performing identical transformation from the feature quantities to the feature quantities, for adding the amount of perturbation to the output feature quantities after the transformation, and for performing re-learning of the TNN model such that the estimated value is maximized or minimized;

recognizing means for pattern-recognizing a pre-learned image according to the estimated value that is obtained when feature quantities calculated and extracted from the pre-learned image are input into the TNN model after the re-learning; and forecast means for forecasting and outputting a future radar image based on result of the pattern recognition of the pre-learned image.

10. A weather forecast apparatus for providing a weather radar image to an FNN model, which is a network model for learning and forecasting, so that the model learns weather dynamics and forecasts weather by using the FNN model after the learning, comprising:

feature quantity calculating means for calculating and extracting plural feature quantities from a radar image;

a PNN model, which is a neural network model for pattern classification, for selecting reference vectors based on the feature quantities that are input from the feature quantity calculating means;

learning means for providing the feature quantities extracted by the calculating and extracting means for the PNN model, and for performing learning of the PNN model by finding a minimum value of an object function such that the quantization error of each reference vector which belong to each output unit of the PNN model is minimized;

classifying means for classifying a class of the image according to the reference vectors that were selected by the PNN model, wherein systematic classification of a pre-learned image is performed by inputting the feature quantities calculated and extracted; from the pre-learned image into the PNN model after the learning and forecast means for forecasting and outputting a future radar image based on result of the classification of the pre-learned image.

11. A weather forecast apparatus as claimed in one of claims 9 or 10, wherein the feature quantities are selected from the group consisting of energy, entropy, correlation, local homogeneity, and inertia based on a co-occurrence matrix; contrast, angular second moment, entropy; mean, and inverse difference moment based on a GLDM; and short run emphasis, long run emphasis, gray level distribution, run length distribution, and run percentage based on a GLRLM.

12. A weather forecast apparatus as claimed in claim 10, wherein the PNN model is a competitive learning model.

* * * * *

UNITED STATES PATENT AND TRADEMARK OFFICE
CERTIFICATE OF CORRECTION

PATENT NO. : 5,796,611
DATED : August 18, 1998
INVENTOR(S) : Keihiro Ochiai, et. al.

It is certified that error appears in the above-indentified patent and that said Letters Patent is hereby corrected as shown below:

Claim 10, column 24, line 28, before "network", insert --neural--.

Claim 10, column 24, line 49, after "extracted", delete ";".

Claim 10, column 24, line 50, after "learning", insert --;--.

Signed and Sealed this

Sixteenth Day of November, 1999

Attest:

Q. TODD DICKINSON

*Attesting Officer*           *Acting Commissioner of Patents and Trademarks*